(12) United States Patent
Tanaka et al.

(10) Patent No.: US 9,304,629 B2
(45) Date of Patent: Apr. 5, 2016

(54) RADIAL TRANSDUCER FOR ACOUSTIC WAVE TOUCH SENSOR

(75) Inventors: Yoshikazu Tanaka, Yokohama (JP); Daniel H. Scharff, San Leandro, CA (US); Ting Gao, Sunnyvale, CA (US); Joel C. Kent, Fremont, CA (US); James L. Aroyan, Santa Cruz, CA (US)

(73) Assignee: ELO TOUCH SOLUTIONS, INC., Menlo Park, CA (US)

( * ) Notice: Subject to any disclaimer, the term of this patent is extended or adjusted under 35 U.S.C. 154(b) by 201 days.

(21) Appl. No.: 13/296,936

(22) Filed: Nov. 15, 2011

(65) Prior Publication Data

US 2013/0120322 A1 May 16, 2013

(51) Int. Cl.
*G06F 3/043* (2006.01)

(52) U.S. Cl.
CPC .............. *G06F 3/043* (2013.01); *G06F 3/0433* (2013.01)

(58) Field of Classification Search
CPC ...... G06F 3/043; G06F 3/0436; G06F 3/0433
USPC .................................................. 345/173, 177
See application file for complete search history.

(56) References Cited

U.S. PATENT DOCUMENTS

| | | | |
|---|---|---|---|
| 4,700,176 A | 10/1987 | Adler | |
| 4,859,996 A | 8/1989 | Adler et al. | |
| 5,094,108 A * | 3/1992 | Kim et al. | 73/627 |
| 5,630,857 A * | 5/1997 | Xu et al. | 65/17.3 |
| 5,691,959 A | 11/1997 | Kriewall et al. | |
| 5,854,450 A | 12/1998 | Kent | |
| 5,986,224 A | 11/1999 | Kent | |
| 6,091,406 A | 7/2000 | Kambara et al. | |
| 6,225,985 B1 | 5/2001 | Armstrong et al. | |
| 6,414,673 B1 | 7/2002 | Wood et al. | |
| 6,441,809 B2 | 8/2002 | Kent et al. | |
| 6,567,077 B2 | 5/2003 | Inoue et al. | |
| 6,593,917 B2 | 7/2003 | Toda | |
| 6,741,237 B1 | 5/2004 | Benard et al. | |
| 6,803,906 B1 | 10/2004 | Morrison et al. | |
| 7,006,081 B2 * | 2/2006 | Kent et al. | 345/177 |
| 7,119,800 B2 | 10/2006 | Kent et al. | |
| 7,193,617 B1 | 3/2007 | Kanbara et al. | |

(Continued)

OTHER PUBLICATIONS

United States Office Action for U.S. Appl. No. 13/296,953, dated Aug. 13, 2013.

(Continued)

*Primary Examiner* — Aneeta Yodichkas
*Assistant Examiner* — Joseph Fox
(74) *Attorney, Agent, or Firm* — Alston & Bird LLP

(57) ABSTRACT

Radial transducers are provided for acoustic touch sensors. Different radial transducer arrangements may allow for locating multiple simultaneous touches without ambiguity, in some embodiments without a bezel. Instead of transmitting acoustic waves along a line to be reflected at multiple points, surface acoustic waves are transmitted in a radial wave pattern. Surface acoustic waves are transmitted along different angles spread out over at least part of the touch region. Various techniques may be used to generate the radial wave pattern, such as a convex wedge of a wedge transducer, interference patterns, a curved piezoelectric element, a curved reflector, a curved edge of the substrate, a curved grating, or one or more lenses. These devices for controlling the spread of the surface acoustic waves may alternatively be used for control of the surface acoustic rays for transmission along a single line or just along two lines (e.g., X and Y axes).

8 Claims, 15 Drawing Sheets

(56) References Cited

U.S. PATENT DOCUMENTS

| | | |
|---|---|---|
| 7,274,358 B2 | 9/2007 | Kent |
| 7,423,636 B2 | 9/2008 | Sano et al. |
| 7,468,785 B2 | 12/2008 | Lieberman |
| 7,545,365 B2 * | 6/2009 | Kent et al. .................. 345/173 |
| 8,519,982 B2 | 8/2013 | Camp, Jr. et al. |
| 2005/0035685 A1 | 2/2005 | Tanaka et al. |
| 2005/0156911 A1 * | 7/2005 | Tanaka et al. ............... 345/177 |
| 2005/0243071 A1 | 11/2005 | Kent et al. |
| 2006/0038798 A1 | 2/2006 | Katsuki et al. |
| 2006/0039831 A1 * | 2/2006 | Natarajan et al. ............ 422/102 |
| 2006/0139339 A1 | 6/2006 | Pechman et al. |
| 2006/0181523 A1 | 8/2006 | Nakazawa et al. |
| 2006/0181524 A1 | 8/2006 | Nakazawa et al. |
| 2007/0024599 A1 * | 2/2007 | Kent et al. ................... 345/177 |
| 2009/0213094 A1 * | 8/2009 | Bridger ........................ 345/175 |
| 2009/0295755 A1 | 12/2009 | Chapman et al. |
| 2010/0026667 A1 | 2/2010 | Bernstein |
| 2010/0117993 A1 | 5/2010 | Kent |
| 2010/0141607 A1 | 6/2010 | Ryoo et al. |
| 2010/0201637 A1 | 8/2010 | Herne et al. |
| 2011/0234545 A1 | 9/2011 | Tanaka et al. |
| 2011/0298753 A1 | 12/2011 | Chuang et al. |
| 2012/0056807 A1 | 3/2012 | Chapman et al. |
| 2012/0139875 A1 | 6/2012 | Huang et al. |
| 2012/0188773 A1 | 7/2012 | Jakobsen et al. |

OTHER PUBLICATIONS

M. Takeuchi et al., "Laser Ultrasonic Micromanipulator," 2000 IEEE Ultrasonics Symposium, pp. 1-6.

International Search Report and Written Opinion for Application No. PCT/US2012/064745 dated Apr. 11, 2013.

International Preliminary Examining Authority, International Preliminary Report on Patentability for International Application No. PCT/US2012/064745, mailed Feb. 6, 2014, 13 pages, European Patent Office, Germany.

International Preliminary Examining Authority, Written Opinion for International Application No. PCT/US2012/064745, mailed Nov. 11, 2013, 12 pages, European Patent Office, Germany.

United States Patent and Trademark Office, Office Action for U.S. Appl. No. 13/296,953, Dec. 3, 2014, 45 pages, USA.

United States Patent and Trademark Office, Office Action for U.S. Appl. No. 13/296,953, Jul. 29, 2015, 53 pages, USA.

United States Patent and Trademark Office, Notice of Allowance for U.S. Appl. No. 13/296,953, Jan. 20, 2016, 16 pages, USA.

* cited by examiner

112 — Generate Radial SAW

114 — Detect SAW Radial Angle

116 — Determine Location

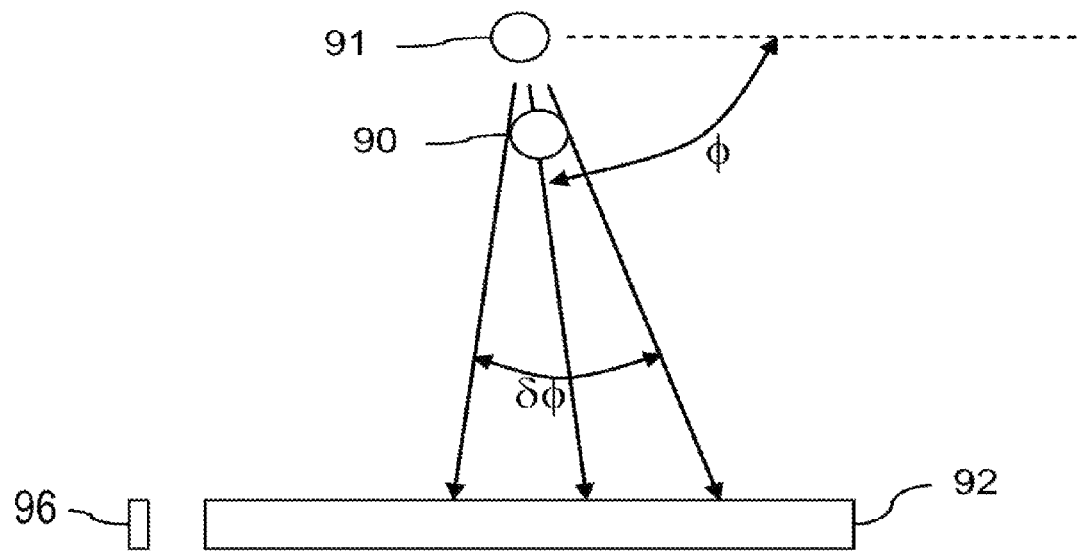
FIG. 24
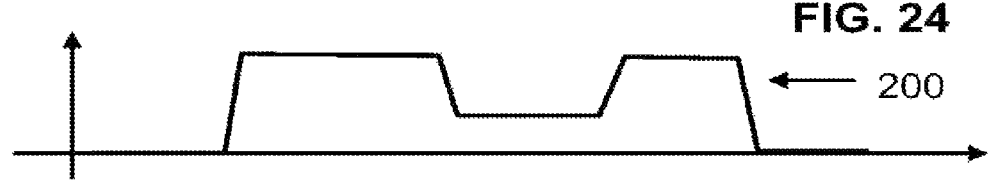
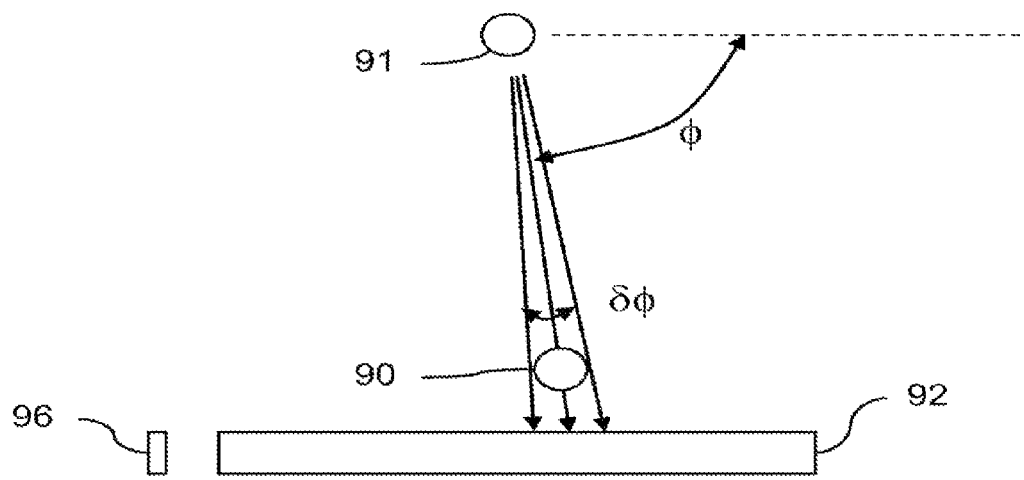
FIG. 25
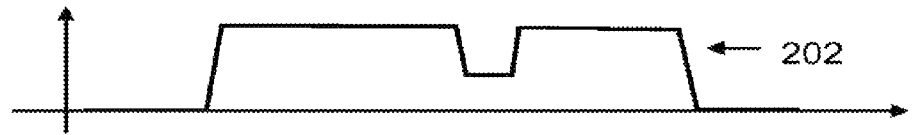

RADIAL TRANSDUCER FOR ACOUSTIC WAVE TOUCH SENSOR

BACKGROUND

Touch sensors detect touch, such as from a user's finger, a stylus, or some other object. Touch sensors may be transparent or opaque input devices for computers or other electronic systems. A transparent touch sensor, such as a touchscreen, may be used in conjunction with a display device. Touch displays are increasingly used in commercial applications, such as restaurant order entry systems, industrial process control applications, interactive museum exhibits, public information kiosks, pagers, cellular phones, computers, personal digital assistants, and video games.

Acoustic-based sensors may be used to detect touch. Certain types of acoustic touchscreens, also known as ultrasonic touchscreens, detect touch with high transparency and high resolution, while providing a durable touch surface. Of particular commercial interest are ultrasonic touchscreens using surface acoustic waves. FIGS. 16A and 16B show an example of a conventional wedge transducer 26 for generating surface acoustic waves that all propagate in a direction represented by arrow 5. A piezoelectric element 30 mounted on the top back surface (also referred to as a first surface) of the wedge generates bulk pressure acoustic waves, represented by rays, in the wedge 28. At the boundary surface of the wedge 28 that is on or in contact with the touch substrate 10, surface acoustic waves, represented by ray 5, are generated that propagate across the touch substrate 10.

A surface acoustic wave touchscreen includes a substrate on which the surface acoustic waves propagate. X and Y transducers generate surface acoustic waves along perpendicular axes. Transmit reflective arrays proximate the edges of the touch substrate and spaced along the axes reflect the transmitted surface acoustic waves across the touchscreen's touch surface along perpendicular paths. Receive reflective arrays proximate the edges of the touch substrate and spaced along opposite sides from the transmit reflective arrays reflect the surface acoustic waves that have propagated across the touch surface to X and Y receive transducers or sensors. These reflective arrays may be referred to as "linear reflective arrays", and acoustic waves traveling in a linear direction partially pass through the linear reflective array and partially are reflected by the linear reflective array in a direction normal to the linear direction. When a touch occurs on the touch surface, the touch causes attenuation of the surface acoustic waves at corresponding locations along the two axes, X and Y. The X, Y touch position is determined based on the timing of the attenuation in the signal received at the receive sensors.

With some conventional surface acoustic wave touch sensors, multiple simultaneous touches may be difficult to correctly locate due to ambiguity. The multiple touches cause the detection of two X and two Y attenuation coordinate locations, so that it may be unclear which detected X location is associated with a particular detected X, Y location. Associating the correct combination of X and Y locations together to determine the proper coordinates requires a guess or more information.

SUMMARY

In a first aspect, a wedge transducer is provided for an acoustic wave touch sensor having a touch substrate. A radial wedge connects on a first surface with a piezoelectric element. The radial wedge has a reflection surface and a boundary surface. The boundary surface is on the touch substrate. The reflection surface is positioned relative to the piezoelectric element such that the boundary surface is capable of converting between first acoustic waves reflecting off of the reflection surface and second acoustic waves propagating in a radial pattern on the touch substrate. The radial pattern diverges as a distance from the radial wedge increases.

In a second aspect, an acoustic wave generator is provided for touch sensing. A touch substrate has a touch region. A transducer is connected to the touch substrate. The transducer is configured to transmit or receive acoustic waves in a radial pattern onto or from the touch substrate. The radial pattern spans the touch region. The transducer is a wedge and a piezoelectric element. The radial pattern diverges as a distance from the transducer increases.

In a third aspect, an acoustic wave generator is provided for touch sensing. A touch substrate has top and bottom surfaces and a curved connecting surface coupling the top and bottom surfaces. The top surface has a touch region. A transducer is on the bottom surface. The transducer is configured to generate or receive acoustic waves on the bottom surface directed towards or propagating from the curved connecting surface such that the curved edge causes the acoustic waves to propagate in a radial pattern on the touch region. The radial pattern diverges as a distance from the transducer increases.

In a fourth aspect, a surface acoustic wave generator is provided for touch sensing. A touch substrate has a bottom surface and a top surface. The top surface has a touch region. A radial transducer includes a pattern over the top surface and a piezoelectric element. The pattern is curved shapes causing surface acoustic waves in a radial acoustic pattern on a touch region of the touch surface. The radial acoustic pattern diverging as a distance from the transducer increases.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 24 is a top view diagram of one embodiment of part of a touch sensor layout with a radial pattern for detecting radius based on attenuation width; and FIG. 25 is a top view diagram of one embodiment of part of a touch sensor layout with a radial pattern for detecting radius based on attenuation width for comparison with FIG. 24.

DETAILED DESCRIPTION OF SPECIFIC EMBODIMENTS

Figure 1:
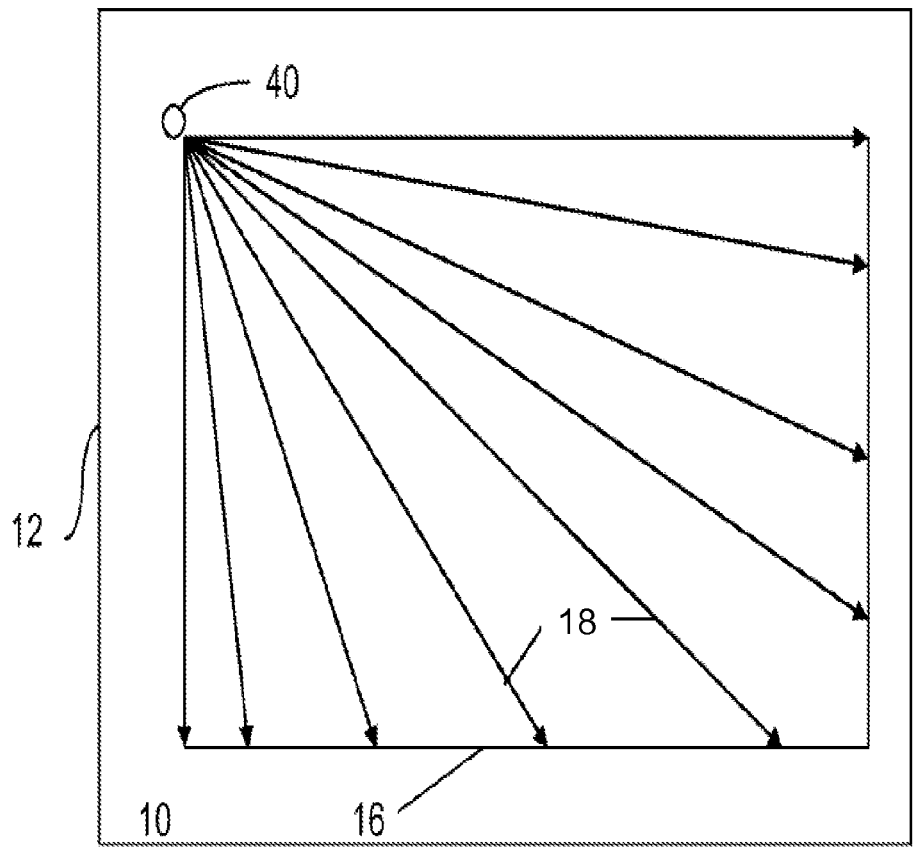
FIG. 1 is an example general diagram of a touch surface in top view with a radial transducer for generating radial surface acoustic waves.

Radially transmitted or received surface acoustic waves may be used for touch sensors used in zero-bezel product designs, multiple touch sensors, or other uses. The fanned out beam or radial wave pattern is generated by a surface acoustic wave generator. The transducer of the surface acoustic wave generator may be positioned on a back or front side of a touch surface. In cases where surface acoustic waves are desired to fully illuminate or propagate over the desired touch area, radially transmitted or received surface acoustic waves may complete the desired coverage of the touch area with touch sensitive surface acoustic waves. By using multiple such fanned out beams, ambiguity for multiple touches may be avoided while still sensing touches at the periphery of the touch surface. Different embodiments are provided for a surface acoustic wave generator or receiver of a fan beam. A convex wedge transducer may produce a radial or fanned out beam. For example, the wedge of the radial wedge transducer is modified so that the piezoelectric element is mounted on the wedge front surface and so that a curved back surface of the wedge functions as a curved focusing mirror or reflection surface to reflect bulk pressure waves propagating in the wedge material. As another example, a linear wedge is modified with a pattern of slots designed in the surface that bonds to the glass, creating interference to fan out the generated surface acoustic waves. In another example, a wedge transducer generates a generally focused or linear wavefront, but another device spreads or fans the wavefront. Such other devices include an acoustic lens (e.g., a glass frit lens), a rounded glass edge, or a curved reflector. In yet another example, a curved piezoelectric element generates a divergent wavefront in the wedge, resulting in diverging surface acoustic waves.

In a conventional wedge transducer, a "wedge" serves to couple vibrations of a piezoelectric element to surface acoustic waves propagating a substrate surface. In a conventional wedge transducer, this element that couples piezoelectric element vibrations and surface acoustic waves indeed has a geometry approximating a wedge shape. In the field, it has become common and concise to use the term "wedge" for this coupling element. In radial wedge transducer design, such a coupling element may be termed a "wedge" even in cases where the "wedge" no longer has a wedge shape.

In other embodiments, the surface acoustic wave generator for radial waves does not include a wedge. For example, a grating of curved lines generates surface acoustic waves in a radial pattern in response to impinging waves transmitted through the touch substrate from a piezoelectric element. As another example, a comb of curved lines generates surface acoustic waves in a radial pattern in response to waves transmitted from a piezoelectric element in contact with the comb. In yet another example, a piezoelectric film with curved interdigital electrodes generates the surface acoustic waves in the radial pattern.

FIG. 1 shows an example general diagram of a touch sensor arrangement. A touch surface 12 includes a radial surface acoustic wave generator 14 or radial acoustic transducer for generating (and/or receiving) surface acoustic waves 18 (shown with solid line arrows) in a radial pattern over a touch region 16. Additional components may be provided. For example, additional surface acoustic wave generator 14 and/or reflective arrays and acoustic receive transducers (not shown) are provided for sensing touches from interference with the surface acoustic waves 18. In some embodiments, the surface acoustic wave generator 14 may include a linear transducer for generating a surface acoustic wave along a single line for reflection over the touch region 16.

FIG. 1 represents the surface acoustic waves 18 as rays. Such ray tracing is an approximation of acoustic wave propagation. A complete understanding of various second order effects in the design and use of radial surface acoustic waves may extend beyond the ray tracing approximation. Such considerations for the fan beam or radial pattern and propagation may be used. In general, the radial wave pattern (regardless of whether the waves are being propagated away from the transducer or toward the transducer) diverges as the distance away from the transducer increases. Much of the context of discussion and the figures show the rays or surface acoustic waves propagating away from the acoustic wave generator 14, representing transmission or transmit operation. Of course it should be understood that the same or similar radial transducer design or layout may be used in a receive mode. To illustrate receive mode operation, the direction of the arrows or rays is reversed. Any of the transmit or receive operation, layout, or components discussed below may alternatively be used in the other of receive or transmit operation, layout, or components.

The touch surface 12 is the surface of a substrate 10, such as a glass plate in a specific embodiment. Other materials may be used, such as metal, ceramics or polymer-based materials with sufficiently low ultrasonic attenuation. The touch surface 12 is smooth or flat or gently curved to allow propagation of surface acoustic waves over the touch region 16. The touch surface 12 is free of bumps, divots, ridges, or other structures interfering with propagation of surface acoustic waves. In some embodiments, coversheets may be used on top of the plate to form a composite structure of a SAW absorbing coversheet, a small separating air gap that is eliminated at the location of a touch, and a "substrate" capable of propagating surface acoustic waves. In alternative embodiments, such structures are provided on the touch surface 12 in or not in the touch region 16.

Figure 2:
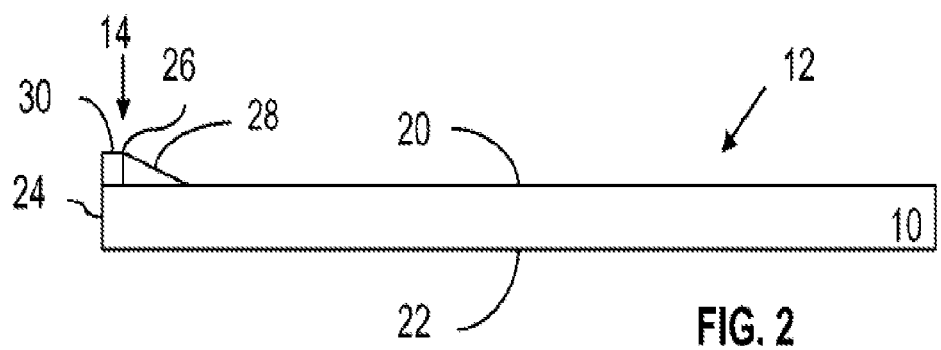
FIG. 2 is a cross-sectional view of the example touch surface and radial transducer of FIG. 1, according to a specific embodiment.

As shown in FIGS. 1 and 2, the touch surface 12 is on a flat slab or substrate 10 with a rectangular shape. Other shapes may be provided, such as circular, square, triangular, or irregular. Rather than being flat, the top 20 and/or bottom 22 of substrate 10 may be curved, wavy, or other non-flat shape. For example, the top surface 20 with the touch region 16 is on a hemisphere or other track ball or mouse shape. A uniform or non-uniform thickness is provided, provided the thickness of substrate 10 is several times greater than the wavelength of the propagating surface acoustic wave.

A connecting surface 24 surrounds and connects the top and bottom surfaces 20, 22. The connecting surface 24 may be flat (straight) or rounded according to different specific embodiments. For example, the connecting surface 24 is rounded without a ridge or sudden transition so that surface acoustic waves may travel from the bottom surface 22 to the top surface 20 and corresponding touch region 16. As another example, the connecting surface 24 has a corner or other sharp transition with the top surface 20 to reflect surface acoustic waves. Different portions of the connecting surface 24 may have different characteristics, such as a corner or ends being rounded or flat and the rest of the connecting surface 24 being the other of flat or rounded.

In one embodiment, the connecting surface 24 is curved (in plan view) and the surface acoustic wave generator 14 is on the bottom surface 22. The curve spreads the surface acoustic waves. Generated surface acoustic waves travel over the rounded edge connecting surface 24 onto the top surface 20. With acoustic receivers positioned on the back surface 22 as well, there is no need for a bezel to protect the perimeter of the top surface 20 of the substrate, thus enabling zero-bezel product designs. In alternative embodiments shown in FIGS. 1 and 2, the transducer 26 is on the top surface 20, such as in a region for overlay of a bezel.

The touch region 16 is defined by the locations at which touches may be sensed based on perturbations of surface acoustic waves or wavefronts with sufficient magnitude or energy above a noise level to be detected. The touch region 16 is of any size and shape. For example, the touch region 16 includes a rectangular, circular, triangular or other shape over which surface acoustic waves propagate. The location of the receive reflective arrays (e.g., a line array of reflector elements on the top surface 20 at X and Y periphery edges) may define part of or the entire touch region 16. The connecting surface 24 may define the touch region 16 along all or part of the touch surface 12.

The surface acoustic wave generator 14 generates surface acoustic waves having a span between by two beam edges that define the touch region 16 such that both beam edges are at the sides of the touch region 16. The beam edges of the generated surface acoustic waves are at a given level down from a peak, such as 3 dB, 6 dB, 10 dB or other level down. Alternatively, the beam edges are where the surface acoustic wave is sufficiently above a noise level to provide for reliable (99%) touch sensing. The beam edges define any angular range or radius, such as 45-90°. In alternative embodiments, the surface acoustic waves radiate over 180°. Within the range of angles, the surface acoustic waves are above the noise level. Alternatively, the surface acoustic wave generator 14 generates surface acoustic waves along two or more vectors (e.g., edges) with one or more regions in-between with less or little surface acoustic wave amplitude. Where multiple surface acoustic wave generators 14 are provided, the beam edges of the fan beam of one surface acoustic wave generator 14 may be within or spaced away from a side edge of the touch region 16.

When more than one surface acoustic wave generator 14 is provided, the region of overlap or set of all regions covered by surface acoustic waves from one or more surface acoustic wave generator 14 provides the touch region 16. A combination of one or more surface acoustic wave generator 14 and one or more linear transducers with arrays of reflectors may be used to form the touch region 16 in some embodiments.

In one embodiment, two or four surface acoustic wave generators 14 are positioned near different corners of a rectangular touch surface 12. A rectangular touch region 16 is formed where touch locations may be detected due to interference with two or four surface acoustic wave propagation paths. Reflectors may be provided for reflecting surface acoustic waves from the surface acoustic wave generator and/or other transducers to further diversify the surface acoustic wave detection.

Referring to FIG. 2, the surface acoustic wave generator 14 is provided as a radial transducer 26 adjacent to the touch surface 12 in a specific embodiment. The radial transducer 26 is bonded to the touch surface 12. Other connections may be used, such as clamping. Acoustic waves transmitted by the surface acoustic wave generator 14 couple to the touch surface 12 at the boundary surface to generate surface acoustic waves propagating along the touch surface 12. The angle may vary for different radial transducers 26 and touch surface 12 materials.

A fanned-out beam may be used for various layouts in a touchscreen system. FIG. 1 shows one example layout. The fanned-out beam is generated and/or received for a given layout by the transducer 14. FIGS. 3-15 relate to various transducers for generation and/or reception of the fanned out beam. Following the discussion of the transducers, various layout embodiments are discussed. FIGS. 17-21 and 23 illustrate the various layout embodiments that may use radial transducers.

In the embodiments shown in FIGS. 2-12 and 14, the acoustic wave generator 14 includes some form of wedge transducer 26. The wedge transducer 26 generally includes a wedge 28 (which does not necessarily have a wedge shape) and a piezoelectric element 30 connected on a first surface of the wedge, and the wedge 28 meets the touch substrate at a boundary surface. Additional components, such as electrical wiring and current or voltage generator, may be provided. Also, a casing or housing may be provided.

The piezoelectric element 30 is any piezoelectric material. A block of ceramic, composite of posts or ridges in polymer material, or film of piezoelectric material may be used. For example, a rectangular block, slab, or plate of piezoelectric ceramic is provided. Electrodes may be positioned on opposite sides of the piezoelectric material. By changing the potential across the piezoelectric material, the piezoelectric material mechanically expands and contracts. Varying the electric potential causes oscillating pressure waves to be generated.

The piezoelectric element 30 typically is flat, such as a plate, allowing efficient contact with a flat surface of the wedge 28. The flat or slab shape may provide for more efficient and less costly manufacturing. The bulk pressure waves generated by the piezoelectric element 30 are predominantly linear in the sense that power flow is concentrated in one direction and wavefronts of maximum expansion and contraction approximate parallel planes perpendicular to the power flow direction. In alternative embodiments, the piezoelectric element 30 is curved along at least one surface of the wedge 28. By being curved, the piezoelectric element 30 generates the pressure waves, at least partly, in a radial pattern.

Figure 16A:
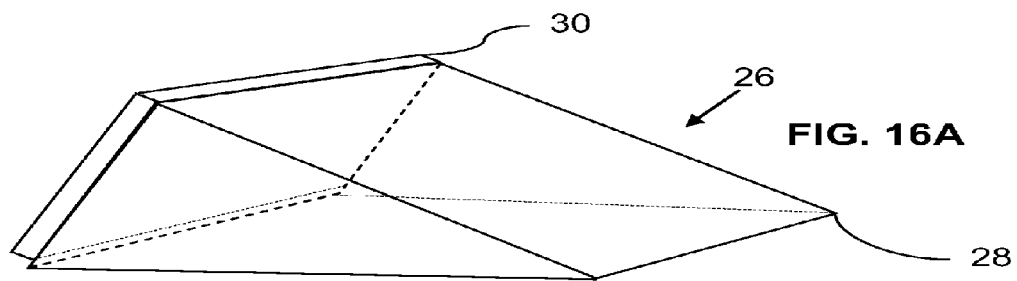
FIGS. 16A and 16B are perspective and side views of a conventional linear wedge transducer.
Figure 16B:
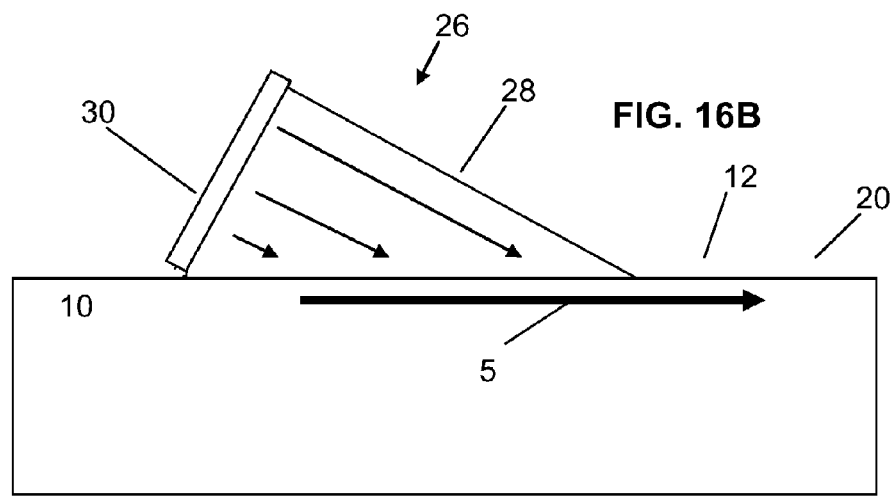

The wedge 28 may be of varying shape and size, according to various embodiments. The wedge 28 couples bulk pressure waves induced by piezoelectric vibrations to surface acoustic waves propagating on substrate 10. A well known and used shape for such a coupler is a conventional wedge shape such as shown in FIGS. 16A and 16B. According to some embodiments of the radial transducers, a conventional linear wedge transducer may be used in combination with other elements to provide the radial propagation of surface acoustic waves. However, for certain radial transducer embodiments, other shapes that have some portion being tapered in a wedge-like manner may be used and for brevity, the term "radial wedge" is used to represent such a coupler even in embodiments where the wedge 28 does not have a conventional wedge shape. Typically, the wedge 28, in transmit mode, is designed to direct bulk acoustic wave energy generated from the piezoelectric element towards the substrate surface at an angle appropriate for coherent generation of surface acoustic waves. Any suitable material for transmitting pressure waves to the touch surface 12 and generating surface acoustic waves at the boundary surface between the wedge 28 and the substrate 10 may be used. In one embodiment, the wedge 28 is a single piece of polymer such as acrylic or acrylate (e.g. Lucite (PMMA)) or any other suitable material transmitting pressure waves at a velocity less than the phase velocity of the desired waves on the substrate. Multiple pieces may be bonded together to form the wedge 28 in other embodiments. Bonded or multiple piece structures may be used to cause reflection or other acoustic wave effects for generating radial surface acoustic waves.

The wedge 28 is connected with the piezoelectric element 30. Any connection, such as bonding with epoxy, may be used. The bonding agent has minimal thickness, such as less than ½ wavelength of the pressure waves. The surface of the wedge 28 mates with and is in acoustic contact (typically via an adhesive bonding layer) with the surface of the piezoelectric element 30. For example, both are flat or have a same curvature, at least in a contact region. As combined, the piezoelectric element 30 may be at any appropriate angle relative to the touch surface 12, depending on the configuration of the wedge 28 itself, to couple surface acoustic waves to or from the touch surface 12.

The pressure waves generated by the piezoelectric element 30 travel through the wedge 28 at an angle relative to the touch surface 12. Depending on the speed of propagation of the pressure waves within the wedge 28, the speed of the surface acoustic waves on the touch surface 12, and the angle of the pressure waves to the touch surface 12 at the boundary between the wedge 28 and the touch surface 12, surface acoustic waves may be generated. The surface acoustic waves propagate on the touch surface 12 rather than through the surface 12, and thus propagate in a different direction than the pressure waves when considering propagation directions in a cross-sectional plane (such as the cross-sectional plane shown in FIG. 16B). The angles on the touch surface 12 of propagation are the same as the associated directional components of the pressure wave vector (i.e., the surface acoustic waves have the same X and Y vector components or direction, but different Z direction where Z is into the surface 12 and X and Y are along the surface 12). That is, in practical engineering terms, the conversion between bulk and surface waves does not change the wave propagation direction in a plan view projection.

According to specific embodiments such as seen in FIGS. 3-8 and 10, the radial wedge 28, having a piezoelectric element connected to a first surface of the wedge, may be configured to convert between first acoustic waves such as bulk pressure waves and second acoustic waves such as surface acoustic waves that form a radial pattern on the touch substrate. In a transmit mode, the radial transducer causes the surface acoustic waves to diverge either initially or after first converging to a focal point under or in front of the wedge 28. The radial wedge 28 causes the surface acoustic waves to diverge in the touch region 16 in some embodiments. The configuration is a shape, change in density (e.g., acoustic impedance), wave guide, or other characteristic causing pressure waves in the wedge 28 to change direction from the linear path traveled from the piezoelectric element 30. Reflection, guiding, or other property causes the waves to propagate in a desired direction. The pressure waves may be made to converge or diverge. For example, the pressure waves converge to a point, line, or area in the radial wedge 28. As another example, the pressure waves converge to a point or region outside the wedge 28 such that the surface acoustic waves converge towards the point or region and after converging, the waves diverge. In the touch region, the resulting surface acoustic waves diverge.

In one embodiment, the radial wedge 28 is configured to cause the surface acoustic waves to diverge in the touch region 16 without reflection in the touch region 16. The surface acoustic waves generated at the boundary surface of the wedge 28 and the touch surface 12 propagate at angles providing wave path divergence in the touch region 16. No reflection or diversion of the surface acoustic waves is needed to provide the radial surface acoustic waves in the touch region 16. In alternative embodiments, one or more reflectors are provided adjacent to the wedge 28 for redirecting the surface acoustic waves to the touch region.

In one example for causing surface acoustic waves to diverge without reflection outside the wedge 28, a radial wedge 28 is provided. FIGS. 3-8 show examples of radial wedges 28. The radial wedges 28 include a reflection surface 40 and a boundary surface (where the wedge and touch substrate meet). The reflection surface 40 is convex, concave, or linear (flat). A single continuous reflection surface 40 is provided, but multiple or discontinuous reflection surfaces may be used. For example, a series of adjacent flat surfaces at different angles form a generally curved surface.

The reflection surface 40 is an exterior surface of the radial wedge 28. The difference in acoustic impedance of the radial wedge 28 and surrounding material (e.g., air, plastic, metal or other housing material) causes most of the acoustic energy of the pressure wave to reflect rather than transmit. Alternatively, the reflection surface 40 is internal to the wedge 28, such as being a boundary between two materials within the wedge with different acoustic impedance.

The reflection surface 40 is positioned relative to the piezoelectric element 30. The distance away from the piezoelectric element 30, angle(s) of the reflection surface 40, and position of any curve in the reflection surface 40 is set to cause divergence or convergence of the surface acoustic waves generated at the boundary surface. The pressure, bulk, acoustic or other waves generated by the piezoelectric element 30 reflect off of the reflection surface 40, causing surface acoustic waves on the touch surface 12 to diverge. The pressure, bulk, longitudinal or other waves reflected from the reflection surface 40 are in a same mode, but may be in a different mode due to the reflection (e.g., shear waves generated by the reflection). The angle of the pressure waves after reflection causes generation of the surface acoustic waves in the radial pattern.

Figure 3A:
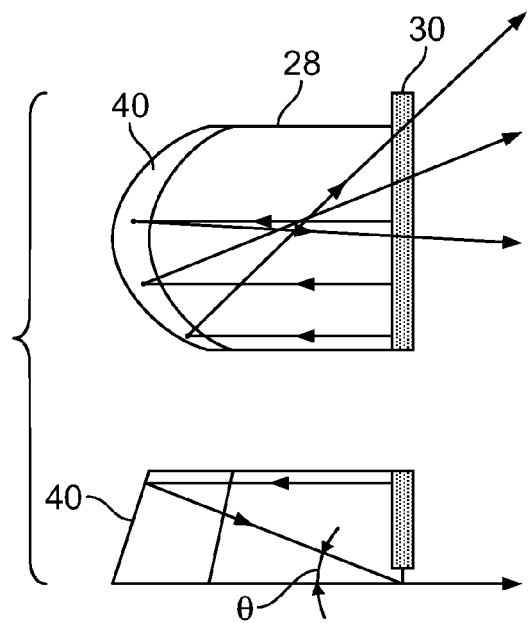
FIG. 3A shows one embodiment of a radial transducer with a convex wedge.
Figure 3B:
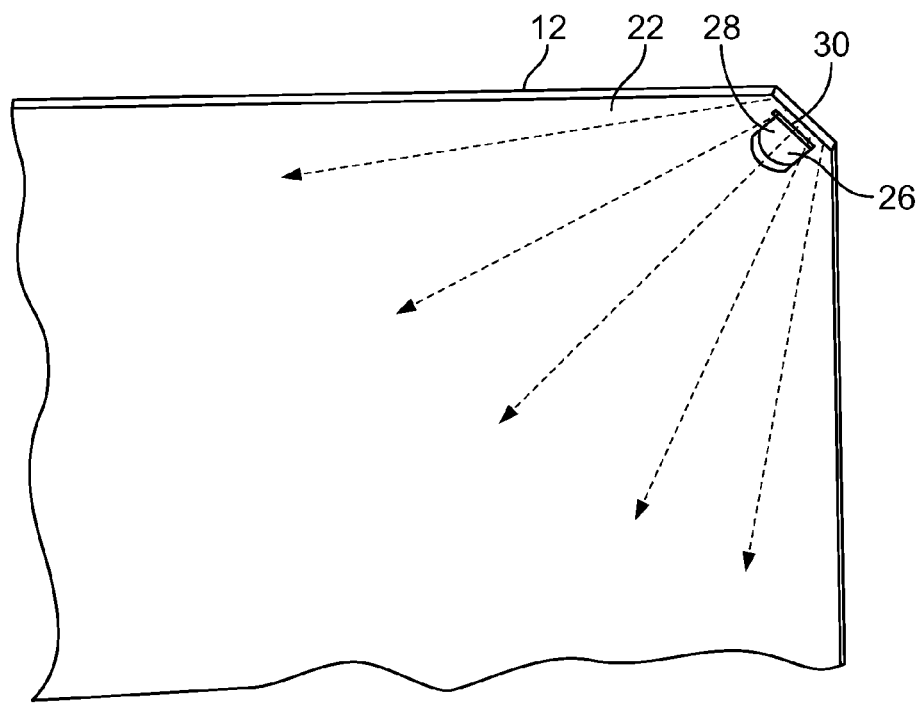
FIG. 3B shows the transducer of FIG. 3A in an example use for radially propagating surface acoustic waves mounted on back of a substrate.

FIGS. 3A and 3B show one example embodiment of a radial wedge 28 for a radial transducer 26. The top portion of FIG. 3A is a top view of the radial transducer and the bottom portion of FIG. 3A is a cross-sectional view of the radial wedge transducer. In this embodiment, the piezoelectric element 30 is connected to wedge 28 so that the element 30 is in a plane 90° relative to the touch surface 12. The reflection surface 40 is curved such that the divergence is caused, at least in part, by the reflection off of the curvature of the reflection surface 40. FIG. 3A shows example rays of the direction of wave travel, including before and after reflection from the reflection surface 40. The reflection surface 40 causes the linearly propagating pressure waves to converge after reflection. After convergence of the pressure waves or resulting surface acoustic waves, the surface acoustic waves diverge.

The angle of the reflection surface 40 causes the pressure waves to propagate back towards the piezoelectric element 30. As shown in FIG. 3A, the reflected pressure waves travel between the reflection surface 40 and the touch surface 12 or a surface connected with the touch surface 12. In some embodiments, the pressure waves generate surface acoustic waves at the boundary surface prior to passing under the piezoelectric element 30 (see FIG. 3A). The radial wedge 28 may include a ridge or other portion separating the piezoelectric element 30 from the touch surface 12. The angle of incidence of the pressure waves to the touch surface 12 is set to couple between bulk waves and the surface acoustic waves.

FIG. 3B shows an example use of the radial transducer identical to that shown in FIG. 3A except that it is not bonded to the touch surface 12. The radial wedge 28 is mounted on the bottom surface 22 of substrate 10 and positioned with the piezoelectric element 30 mounted closer to a truncated corner of substrate 10 than reflection surface 40. As the radial transducer is on the bottom surface 22, the touch sensor may enable bezel-less product designs. As discussed above, the reflection surface 40 functions as a curved focusing minor to reflect pressure waves propagating in the wedge material. The generated surface acoustic waves propagate from the wedge 28 towards a rounded connecting surface 24 of the substrate 10. The rounded connecting surface 24 transfers the wave between substrate surfaces resulting in surface acoustic waves propagating over the touch region 16 (surface acoustic waves are shown in dotted line arrows to indicate the propagation on top surface 20 opposite to bottom surface 22 where the radial transducer is mounted). The bezel-less product compatible surface acoustic wave touch sensors are described in more detail in U.S. patent application publication no. 2011/0234545, which is incorporated by reference. In alternative embodiments, the radial transducer 26 shown in FIG. 3B is turned 180° and is mounted on top surface 20 so that the surface acoustic waves propagate over the touch region 16 without traversing the connecting surface 24 (and a bezel may cover the transducer).

Figure 4:
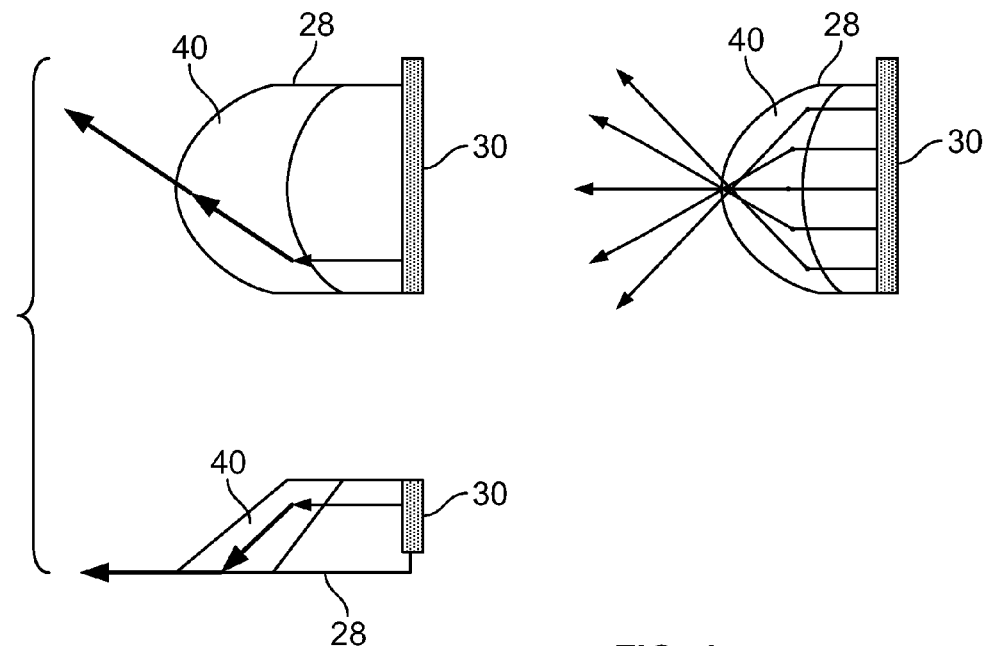
FIGS. 4-8 illustrate other embodiments of radial wedge transducers with varying configurations of wedges for radial transmission.

FIG. 4 shows another embodiment of a radial wedge 28 similar to the embodiment shown in FIG. 3 except having a longer and less steeply angled reflection surface 40. The top portion of FIG. 4 shows simplified top views of the radial transducer, and the bottom portion of FIG. 4 shows a cross-sectional view of the radial transducer. In this embodiment, the piezoelectric element 30 is connected to wedge 28 so that the element 30 is in a plane 90° relative to the touch surface 12. The reflection surface 40 is angled to cause the pressure waves to reflect while continuing to propagate away from the piezoelectric element 30. The angle is set to cause the pressure waves incident on the boundary with the touch substrate 10 to generate surface acoustic waves. In one example using an acrylic wedge 28 and glass touch surface, the angle of the pressure wave direction to the reflection surface is about 16.5°, causing an angle of incidence at the boundary to the touch surface of about 33°. Depending on materials used, orientation of piezoelectric element 30, and other design choices, the optimal angles may vary.

The curvature of the reflection surface 40 causes the reflected pressure waves to converge. After convergence in the wedge 28 of the pressure waves and/or convergence on the touch surface 12 of the surface acoustic waves, the surface acoustic waves diverge.

Figure 5:
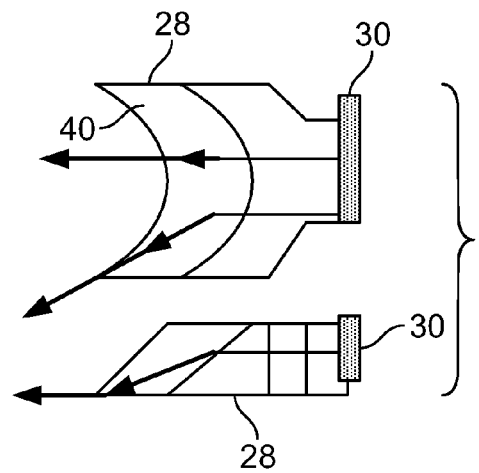

With the top portion showing a top view of the radial transducer and the bottom portion showing a cross-sectional view of the radial transducer, FIG. 5 shows another example radial wedge 28. The reflection surface 40 causes reflection in a diverging pattern rather than initial convergence shown in the embodiment of FIG. 4. The reflection surface 40 shown in FIGS. 3 and 4 provides a convex wedge shape and results in converging beams, while reflection surface 40 of the embodiment of FIG. 5 provides the wedge with a concave and diverging reflection surface 40. In this embodiment, the piezoelectric element 30 is connected to wedge 28 so that the element 30 is in a plane 90° relative to the touch surface 12.

Figure 6:
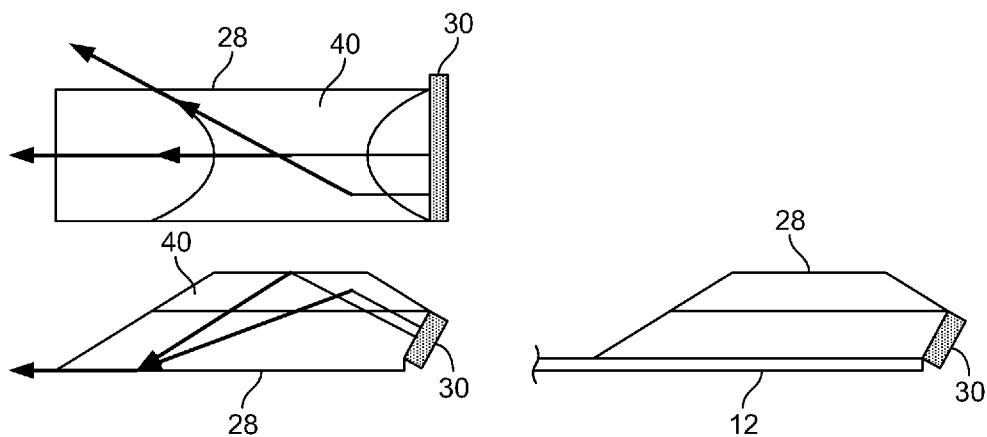

FIG. 6 is another embodiment of a radial wedge 28. The top portion of FIG. 6 shows a top view of the radial transducer and the bottom portion of FIG. 6 shows cross-sectional views of the radial wedge transducer. The reflection surface 40 is the upper surface of the radial wedge 28 rather than a side surface (as with FIGS. 3-5). The piezoelectric element 30 is at an angle other than 90° to the touch surface 12, such as angled to generate pressure waves propagating towards a top of the wedge 28 and away from the touch surface 12. The reflection surface 40 is curved to cause convergence of the reflected pressure waves, but curvature for initial divergence may be used. The reflection surface 40 may be curved along multiple dimensions to cause the reflected pressure waves to intersect the boundary at the desire angle.

Figure 7:
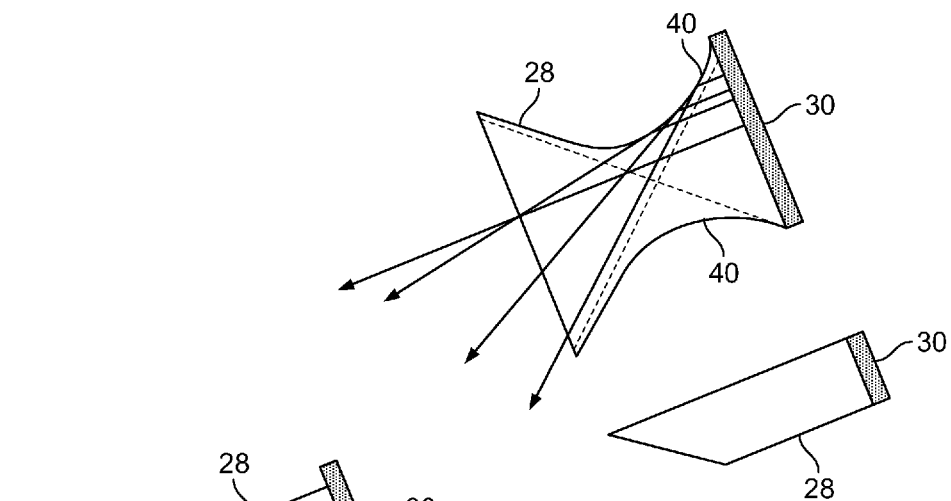

FIG. 7 shows an embodiment with multiple reflection surfaces 40. The top portion of FIG. 7 is a top view of the radial transducer and the bottom portion of FIG. 7 is a cross-sectional view of the radial wedge transducer. The pressure waves reflect once to converge. Pressure waves from the right half reflect towards the left half and vice versa. The reflection surfaces 40 may be flat or curved to distribute the energy of the waves as desired. In other embodiments, only one reflection surface 40 is provided such that the piezoelectric element 30 is at an angle other than 90° to the center of the radial pattern of the surface acoustic waves.

The piezoelectric element 30 is positioned with the wedge 28 to cause the pressure waves as originally generated to be at the intended angle for causing radial surface acoustic waves. The reflection surfaces 40 change the convergence or divergence in two dimensions without changing the angle of incidence along another dimension. Alternatively, the reflection surfaces 40 change the angle to generate surface acoustic waves.

Figure 8:
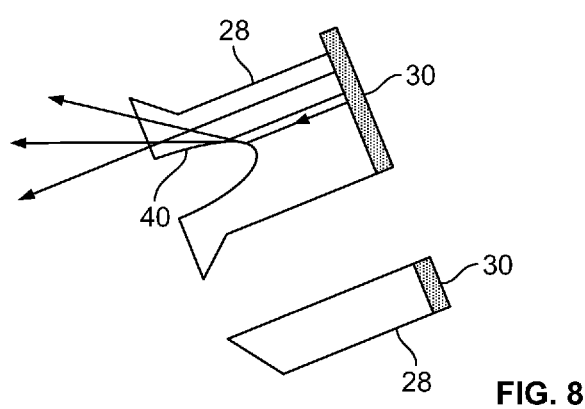

FIG. 8 is another embodiment with the piezoelectric element 30 angled to generate pressure waves for generation of surface acoustic waves. The top portion of FIG. 8 is a top view of the radial transducer, and the bottom portion of FIG. 8 is a cross-sectional view of the radial wedge transducer. The reflection surface 40, which has a generally curved or parabolic shaped, is positioned to reflect the center pressure waves outward rather than reflecting the pressure waves at the edge of the radial wedge outward or inward.

Other shapes for the radial wedge 28 may be used. Combinations of the features of the examples in FIGS. 3-8 may be used. In one alternative embodiment, some or all of the pressure waves are reflected multiple times. To design the exact shapes of the radial wedges 28 for radial transducers, use is made of: 1) the reflection law that the angle of reflection equals the angle of incidence (assuming no mode conversion), 2) in plan view projection, no change in wave propagation direction when the pressure wave in the wedge material refracts and mode converts into a surface acoustic wave in the substrate and 3) Snell's law that the sine of the refracted angle divided by the transmitted wave phase velocity equals the sine of the incident angle divided by incident wave phase velocity. The correct shape in a ray tracing approximation of the reflection surface 40 may be verified by determining that at each point on the surface, the surface normal, incident ray and reflected ray are coplanar and the angle between the surface normal and incident ray equals the angle between the surface normal and the reflected ray. When the reflected pressure wave refracts and mode converts to a surface wave in the substrate, the refracted ray maintains the same direction of the reflected ray in plan view, and for a correct design lead to the desired diverging surface acoustic waves (perhaps after first converging at a focal point). Optimal refraction between pressure waves in the shaped wedge and surface acoustic waves in the substrate may be verified by determining that in the vertical plane containing the reflected and refracted rays that the angle (90°−θ) between pressure wave rays and the substrate normal meets the Snell's Law condition that $\sin(90°-\theta)/V_p = \sin(90°)/V_{saw}$ or $\cos(\theta)=V_p/V_{saw}$, where $V_p$ is the pressure wave phase velocity in the wedge material and $V_{saw}$ is the surface acoustic wave phase velocity. While more systematic design methods may be used, candidate designs may be iteratively developed until the above conditions are met (i.e., experimentation may be used). It may be desirable to go beyond the ray tracing approximation to a full wave mechanics studies either experimentally or via simulation. The same principles may be applied if the piezoelectric element 30 is a shear mode rather than standard pressure mode, except that rays within the shaped wedge material correspond to shear waves with bulk shear wave phase velocity rather than pressure waves. It is also possible to design radial wedge transducers in which conversion between shear and pressure waves occur at the reflection surface 40, in which case a reflection version of Snell's law rather than angle-of-reflectance-equals-angle-of-incidence applies to the reflection. For example, the ray from the piezoelectric element 30 to the reflection surface may correspond to a pressure wave, and the ray from the reflection surface to the substrate may correspond to a shear wave.

Figure 9:
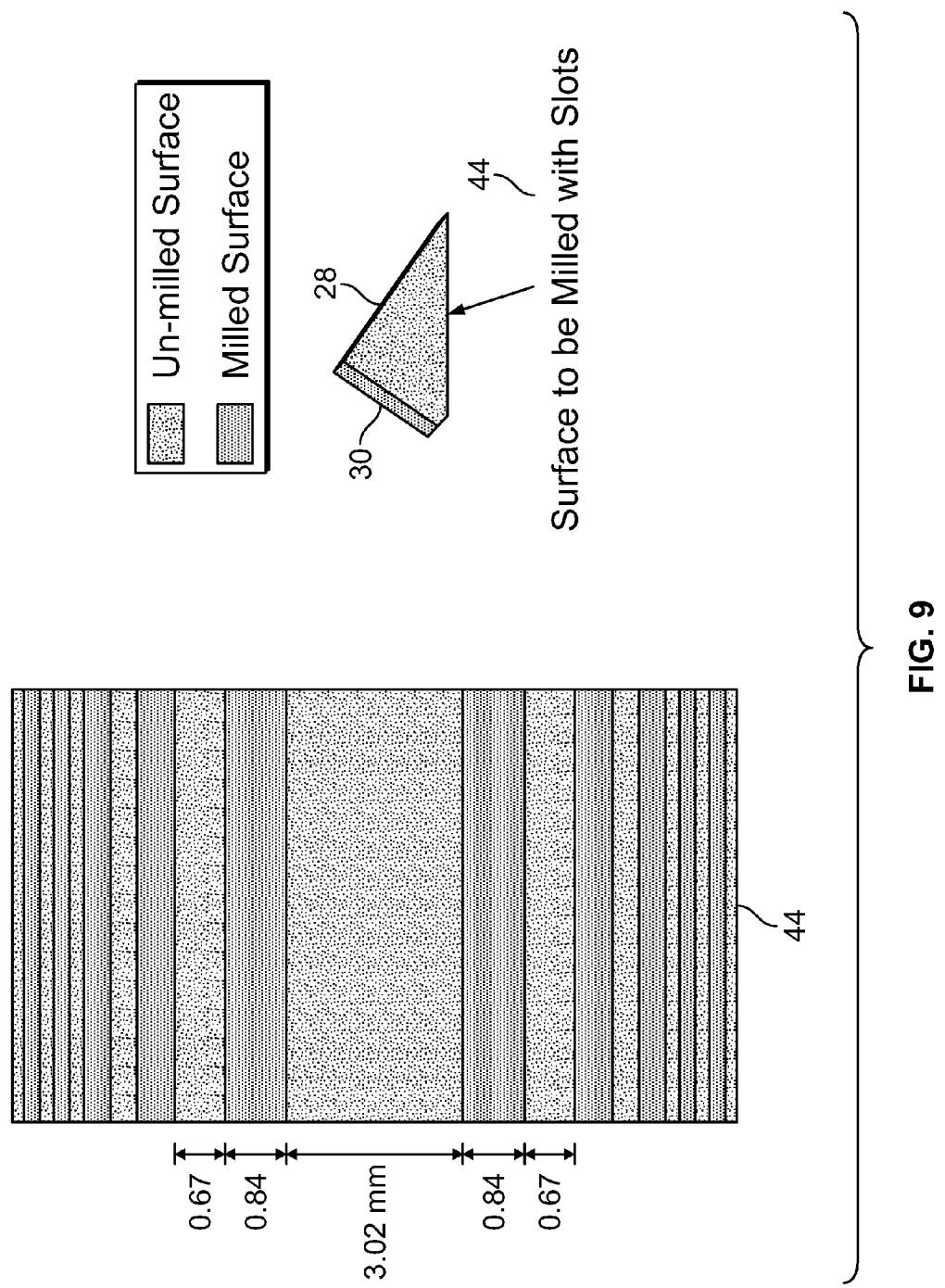
FIG. 9 shows an embodiment of an interference structure on a linear wedge transducer for generating radial surface acoustic waves.

FIG. 9 shows another embodiment of a radial wedge transducer 26 shown in cross-section. Like a conventional linear wedge transducer such as shown in FIG. 16, the wedge 28 and piezoelectric element 30 have flat surfaces. Curved surfaces may be provided in other embodiments. All surfaces except the boundary surface 44 of the wedge 28 to the touch surface 12 may be flat with a tolerance smaller than one or ½ a wavelength of the pressure waves. Alternatively, one or more surfaces are curved or textured. For example, injection-molding gating bumps may be on one or more surfaces. Tighter tolerances may be used to assist in bonding with a very thin adhesive layer. The piezoelectric element 30 and wedge 28 have a standard shape or shape for generating surface acoustic waves at the boundary 44 in a linear pattern. Reflection is avoided, such as by generating pressure waves predominantly directed at the boundary.

Unlike the conventional linear wedge transducer where the boundary surface 44 is flat, to generate the surface acoustic waves in a radial pattern, the boundary surface 44 of the radial transducer according to this embodiment includes an interference structure where selected rays are blocked or phase shifted. The interference structure is formed from slots, different material, apertures or other structure for interfering with the propagation via absorption, reflection or phase shifting. The structure is on the boundary surface 44, but may be away from the boundary surface within the volume of the wedge 28 so that the intensity or phase of pressure waves reaching the boundary surface 44 are modulated as desired. The structure is a series of parallel stripes at least where the pressure waves are incident on the boundary surface 44. In alternative embodiments, curved slots or interference structure having any shape or pattern (e.g., a plurality of hemispheres) is provided.

In one embodiment, the interference structure is made up of slots milled from the boundary surface 44 of the wedge 28, as shown in the left portions of FIG. 9. Other treatments may be used. For example, the slots may be formed by molding. Texturing, surface treatment, differences in density, or other characteristics may be used to form the interference structure. Alternatively, the interference structure may also be provided on the substrate surface rather than the wedge itself, such as by etching and machining grooves or slots in the glass surface.

The interference structure absorbs, reflects, phase shifts and/or otherwise disrupts pressure waves. The disruption causes the surface acoustic waves to diverge (perhaps after converging). For example, FIG. 9 shows a slot pattern on the boundary surface 44. Symmetric slots with different widths are provided (left portion of FIG. 9). The un-milled zones couple to the transmitted surface acoustic wave, and the milled zones do not couple. The surface acoustic waves being generated through or after the interference structure radiate or propagate in a radial pattern (e.g., fan beam). The spacing and shape of the interference structure provides a fan beam with a desired energy distribution across the different angles.

In one embodiment, a material with a different density is placed in the slots or forms the interference structure. Rather than blocking, the interference structure allows for transmission but at a different speed of propagation. By choosing the depth and density of the interference structure, a phase shift may be introduced. A phase shift of 180° is of particular interest. By choosing material with different attenuation, an apodization may be introduced. The phase shift and/or amplitude weighting of different parts of the aperture may defocus or cause divergence. For example, the phase shift reduces a forward beam amplitude, providing for more even distribution of acoustic energy over the fan beam. The transducer design of FIG. 9 (left portion) uses similar wave mechanic principles also used for holograms in optics. In one way to design the pattern in FIG. 9, focal points are chosen in front of the transducer, the distance from each point on the front of the wedge to the desired focal point is computed in units of surface acoustic wave wavelengths, and those points which are within a quarter wavelength of being an integer number of wavelengths from the desired focal point are identified. Via Huygen's principle, waves propagating from these points constructively interfere, if not in perfect coherent phase, so as to contribute to wave amplitude at the desired focal point while waves propagating from the remaining points, had they not been removed, would have destructively interfered with the wave amplitude at the desired focal point. By removing destructively interfering rays via an interference structure, a coherent focus at the desired focal point remains. By phase shifting the rays through the remaining points by 180°, rather than eliminating them, all points along the front of the wedge contribute to a coherent focus. The focal regions are selected to provide a fan pattern.

In yet another embodiments, the pattern of decoupling or 180° phase shift shown to the left of FIG. 9 may be implemented not at a boundary surface 44, but rather at the boundary between piezoelectric element 30 and wedge 28 or within the piezoelectric element 30 itself. For example, the surface facing piezoelectric element 30 of wedge 28 may be provided with a pattern of slots leading to focusing pressure wave front in the wedge 28 that converts at boundary 44 into a focusing pattern of surface acoustic waves propagating in the substrate. Alternatively, the pattern shown to the left of FIG. 9 may be re-interpreted as an electrode pattern on piezoelectric element 30 where the darker shaded regions correspond to electrodes driven (or received) 180° out of phase with respect to the electrodes corresponding to the lighter shaded regions. If electronics support additional shifts of the excitation signal, further embodiments are possible, such as an electrode pattern with three types of regions of relative phases of 0°, 120° and 240° to more efficiently excite (or receive) a focusing pressure wave propagating in the wedge 28

Figure 10:
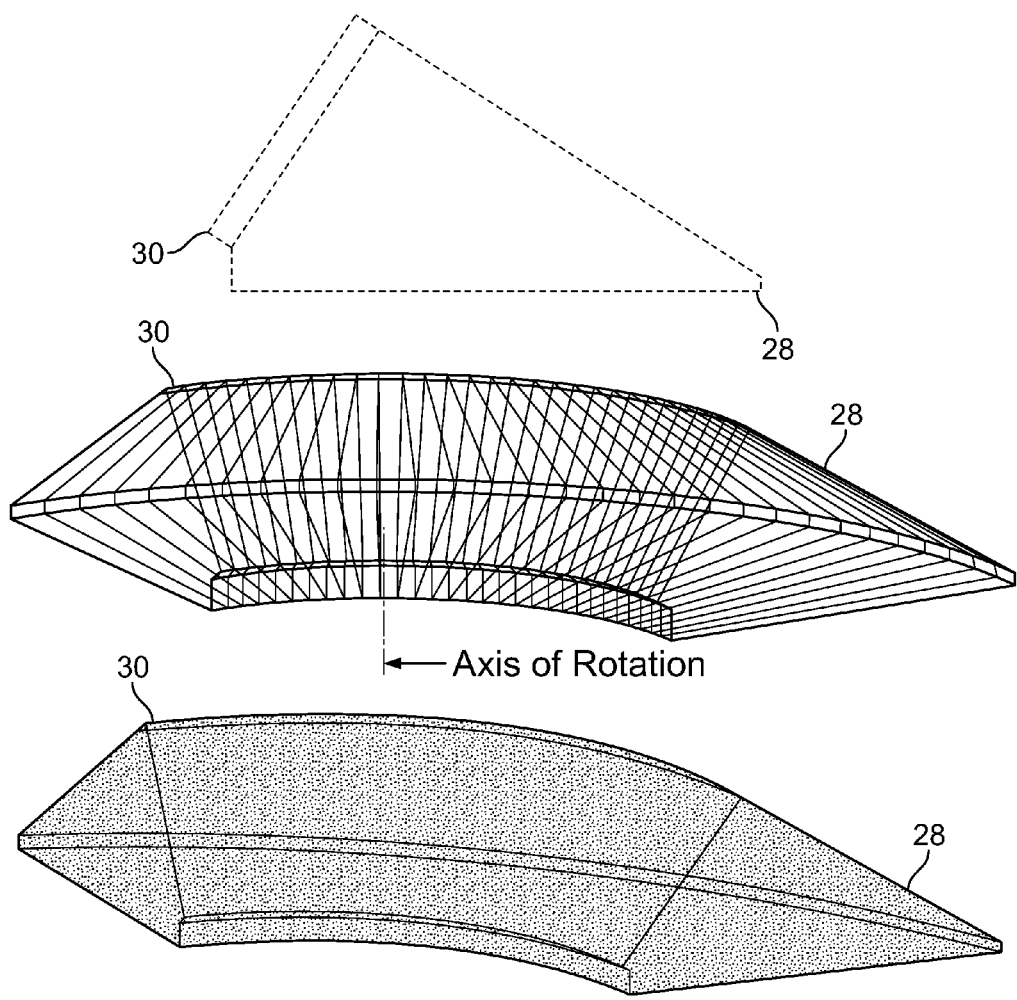
FIG. 10 shows a cross-sectional and two perspective views of a radial transducer with a curved piezoelectric for generating radial surface acoustic waves, according to a specific embodiment.

FIG. 10 shows another embodiment of a radial wedge transducer 26 formed with a radial wedge 28. The piezoelectric element 30 is curved. The piezoelectric element 30 and wedge 28 are formed as if a section were rotated about a vertical axis of rotation, providing a conical shape. FIG. 10 shows a 90° rotation, but greater or less rotation may be used. The curve is provided by a smooth variation or by connecting together flat slabs at slight angles to each other. The piezoelectric element 30 may be formed on the radial wedge 28 or formed separately and bonded to the radial wedge 28. The piezoelectric element may be formed as a curved piece by cutting from a piezoelectric cone element with radial (thickness) resonance at about 5.53 MHz or other desired frequency. About accounts for manufacturing tolerances. Alternatively, a flexible sheet piezoelectric material, such as PVDF, is deposited or cut to the appropriate shape. The piezoelectric element 30 is poled in the radial direction.

The curve causes the pressure waves to radiate in a fan beam or radial pattern. A uniform radial surface acoustic wave pattern corresponding to the angle of rotation of the piezoelectric element is generated.

In the embodiment shown in FIG. 10, the piezoelectric element 30 is angled to transmit pressure waves to the boundary surface without reflection. In other embodiments, the curved piezoelectric element 30 is positioned to reflect the pressure waves off of a surface 40 of the wedge 28, such as the arrangements shown in FIG. 3A and FIG. 4. The reflecting surface 40 has a similar or different amount of rotation or curvature for controlling the divergence of the surface acoustic waves. Such a hybrid of the designs of FIG. 3A or FIG. 4 and FIG. 10 may allow use of a curved piezoelectric element 30 that is a section of a cylinder rather than a section of a cone. Piezoelectric material in the shape of hollow cylinders are typically cheaper and more readily commercially available than sections cut from cones.

Figure 11:
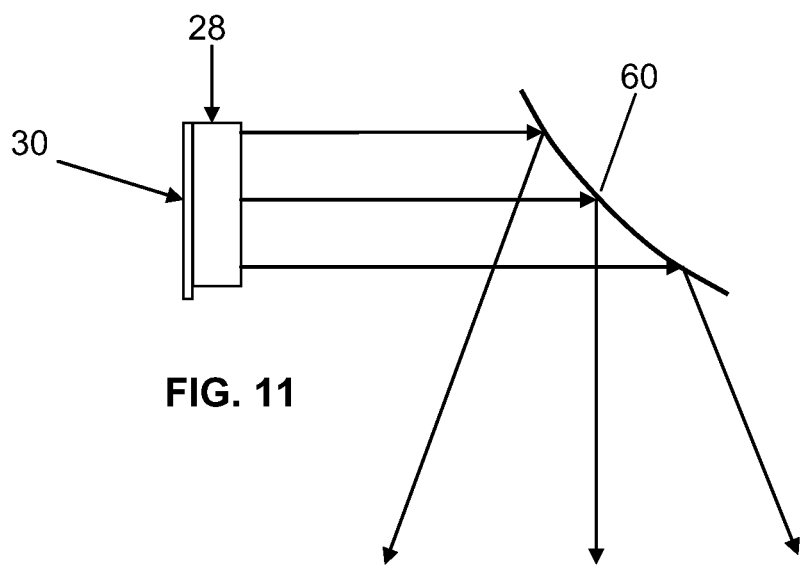
FIG. 11 illustrates a top view of generation of radial surface acoustic waves by reflection of waves from a linear wedge transducer from a curved reflector, according to a specific embodiment.

FIG. 11 shows another embodiment of a surface acoustic wave generator 14. With this embodiment of surface acoustic wave generator 14, a conventional wedge 28 and piezoelectric element 30 generate surface acoustic waves propagating generally or predominantly in a linear direction. Alternatively, a grating transducer or other surface acoustic wave generator is used.

A curved reflector 60 causes the surface acoustic waves to reflect and thus diverge. The curved reflector 60 is a surface acoustic wave mirror, such as an etched channel in the touch surface 12, reflection grating, or a glass surface edge 24. Other reflectors may be used. The curvature is shaped to radiate the surface acoustic waves in the desired fan beam. The curvature is continuous, but may vary to provide greater amplitude at one or more angles in the radiation pattern. In alternative embodiments, the curved reflector 60 is formed from a plurality of linear reflectors at different angles.

The curved reflector 60 is adjacent to the wedge 28 of the wedge transducer 26. The curved reflector 60 may contact or have a portion against part of the wedge 28. As shown, the curved reflector 60 is entirely spaced from the wedge 28. Even spaced from the wedge 28, the curved reflector 60 is adjacent to the wedge 28 relative to the touch region 16. For transmission, the surface acoustic waves reflect from the curved reflector 60 and then propagate into the touch region 16. The curved reflector 60 may alternatively be, at least in part, within the touch region 16.

In another embodiment of a surface acoustic wave generator 14, the surface edge 24 of the touch surface 12 is used to reflect or transmit the surface acoustic waves. By being curved or having parts at different angles, the surface edge 24 causes the surface acoustic waves to propagate in the radial pattern.

Figure 12:
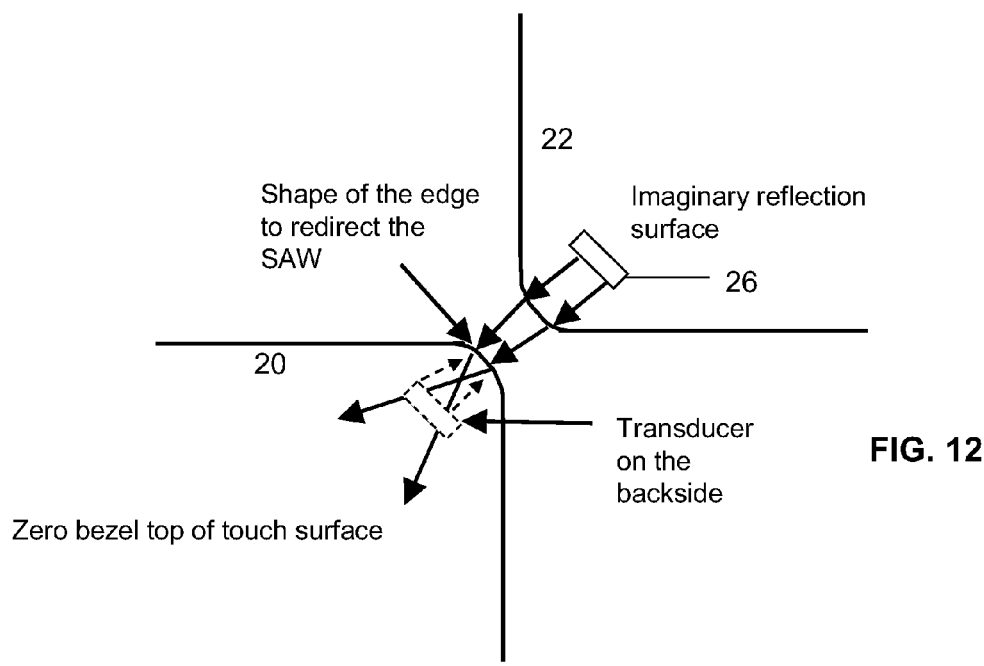
FIG. 12 shows top and bottom views of a part of a touch substrate using a curved corner for generating surface acoustic waves in a radial pattern, according to a specific embodiment.

In the example shown in FIG. 12, the wedge 28 and piezoelectric element 30 or other surface acoustic wave generator 14 is on the bottom surface 22 of substrate 10. FIG. 12 shows two opposite surfaces, the bottom surface 22 and the top surface 20 unfolded in order to illustrate the wave paths from bottom surface 22 via connecting surface 24 to top surface 20. The upper right side of FIG. 12 shows the bottom surface 22, and the lower left side of FIG. 12 shows the top surface 20. The wedge transducer 26 may transmit the surface acoustic waves linearly towards the connecting surface 24 at a corner, or alternatively wedge transducer 26 may be replaced with a radial transducer that by itself partially provides the desired fan out of radial beams. The connecting surface 24 at the corner is rounded in both side and plan view, allowing the surface acoustic waves to propagate over or around the connecting surface 24 onto the top surface 20 of the touch substrate 10. In addition to being rounded from the back 22 to the front 20, the connecting surface 24 is curved within the plane of the top 20 or bottom 22. The curve of the connecting surface changes the angle of the wave propagation. The waves at different locations along the connecting surface 24 are angled to converge. The convergence occurs on the connecting surface 24 or on the top surface 20 adjacent to the connecting surface 24. After convergence, the surface acoustic waves diverge in the touch region 16. Alternatively or in addition, the curved corner of the substrate causes the surface acoustic waves to diverge. Convex or concave corners may be used.

This example may be used on a touch surface 12 to be used in a zero-bezel touch monitor or product. The curve of the connecting surface 24 causes the divergence to occur immediately adjacent to or on the connecting surface 24. Alternatively, the curve of the connecting surface 24 is opposite, causing the surface acoustic waves to diverge along the connecting surface 24. As a result, almost the entire or the entire top surface 20 of the touch substrate 10 may be used for touch sensing.

Figure 13:
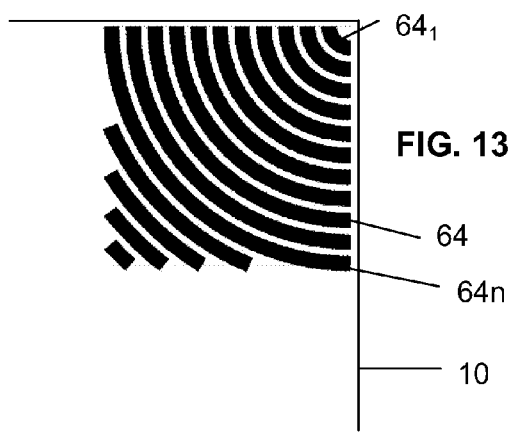
FIG. 13 illustrates curved surface features, such as a grating, comb, or interdigital transducer, for generating surface acoustic waves in a radial pattern, according to a specific embodiment.
Figure 23:
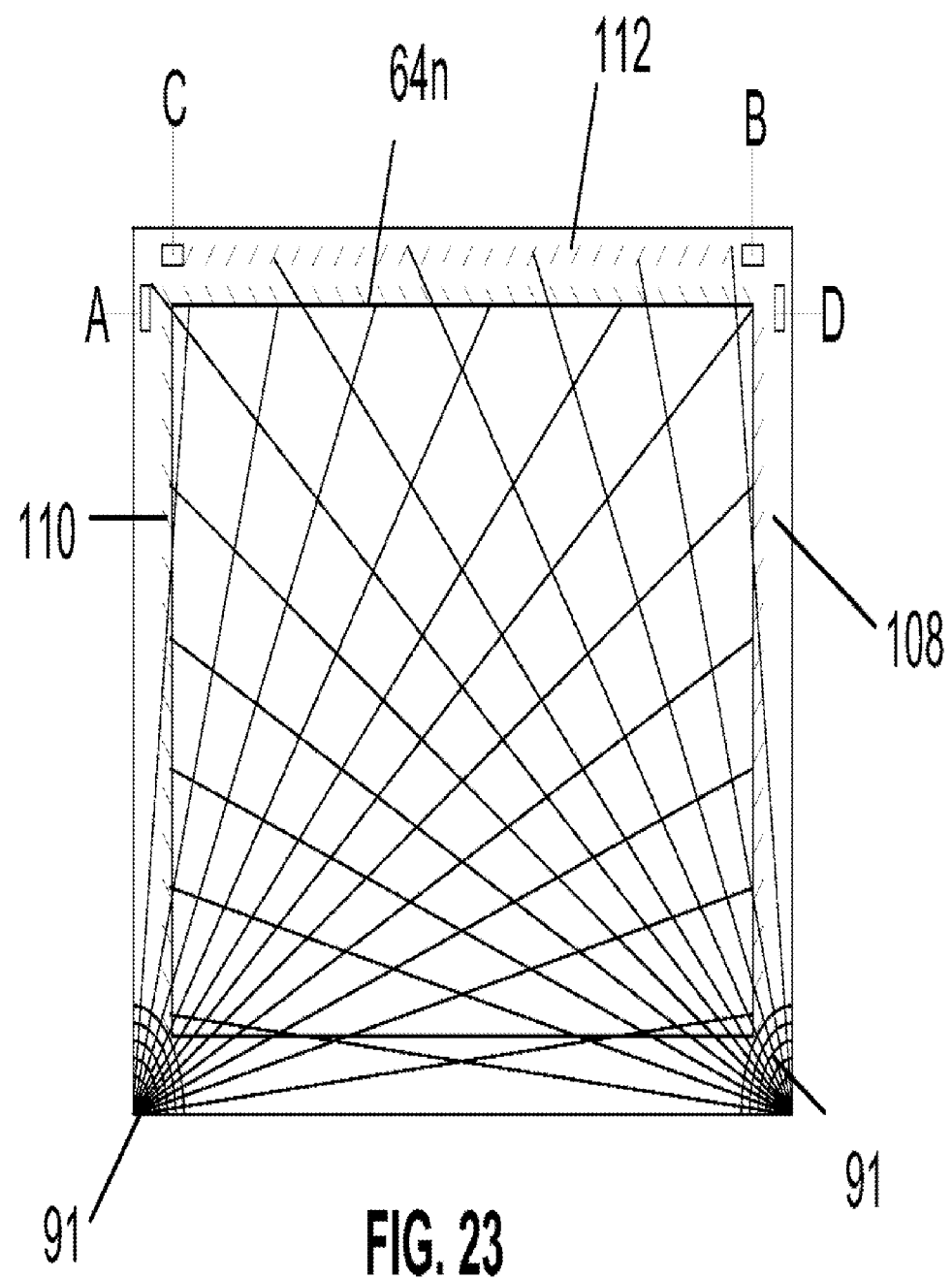
FIG. 23 is a top view diagram of yet another embodiment of a touch sensor layout with radial patterns for a rectangular region.

FIG. 13 shows another embodiment of a radial acoustic wave generator 14 using curved surface feature pattern 64 over the touch substrate 10. According to a specific embodiment, a grating pattern 64 generally being curved shapes (or perturbation elements) formed on the top surface 20 of the touch substrate 10 generates surface acoustic waves when a piezoelectric element on a bottom surface 22 of the touch substrate generates bulk pressure waves from bottom surface 22 toward grating pattern 64. The grating pattern 64 causes surface acoustic waves to radiate in a fan beam or radial pattern rather than along a line on the touch region of substrate 10. According to the illustrated embodiment, each of the plurality of curved perturbation elements is generally concentric to the others and the pattern 64 has a square shaped outline. However, other shaped outlines of the pattern may be used in various embodiments. The grating pattern has a short curved element $64_1$ closest to the corner of the substrate 10 (or furthest from the touch region), followed by progressively longer curved elements (up to the longest curved element $64_n$) that are progressively closer to the touch region, in order to provide the divergent radial wave pattern on the touch region of top surface 20 of the substrate. In some embodiments, the shape of the grating pattern 64 may be different than a square (for example, the elements may have a fan outline shape such as shown in FIG. 23). In other embodiments, the short curved element $64_1$ is farthest from the corner of the substrate 10. Other combinations of short and longer curved elements 64 may be used. In some embodiments, the grating pattern 64 is etched, printed, or deposited on a top surface 20 of the touch substrate 10. Any number of perturbation elements may be used.

The piezoelectric element 30 is on an opposite surface (bottom surface 22) of the touch substrate 10 than the grating pattern 64. The piezoelectric element 30 may be generally parallel with the top surface 20, but may be at an angle. The pressure waves are directed at the grating through the bulk of the substrate. The pressure waves generated by the piezoelectric element 30 cause the curved grating to generate the surface acoustic waves in the diverging radial pattern.

In another embodiment, a comb transducer in the general form of the pattern 64 may be provided. Instead of being on a bottom surface 22, the piezoelectric element 30 is against or on top of the curved grating pattern 64 that is formed on the top surface 20 of substrate 10. Pressure waves generated by the piezoelectric element 30 cause the curved pattern 64 to generate the surface acoustic waves in the divergent radial pattern.

In yet another embodiment of the pattern 64, an interdigital transducer may be provided, where the pattern 64 is of interspersed electrodes that are curved or arranged to cause a radial fan beam. Every even element in the pattern is connected together to a first conductor, and every odd element in the pattern is connected together to a second conductor which is charged oppositely to the first conductor, so that the elements in pattern 64 form interdigitated electrodes formed over the touch substrate. The pattern 64 is thus on or deposited on a piezoelectric film, such as polyvinylidene fluoride (PVDF), that is positioned on the touch surface. The angular span of the fan or radial pattern of surface acoustic waves may be, for example in the range of 45° to 90° or perhaps even larger including 180°. In response to changes in potential between the curved electrodes 64 of the interdigital transducer, the piezoelectric film generates surface acoustic waves in the radial pattern radiate over a span of angles, such as over 45°.

Figure 14:
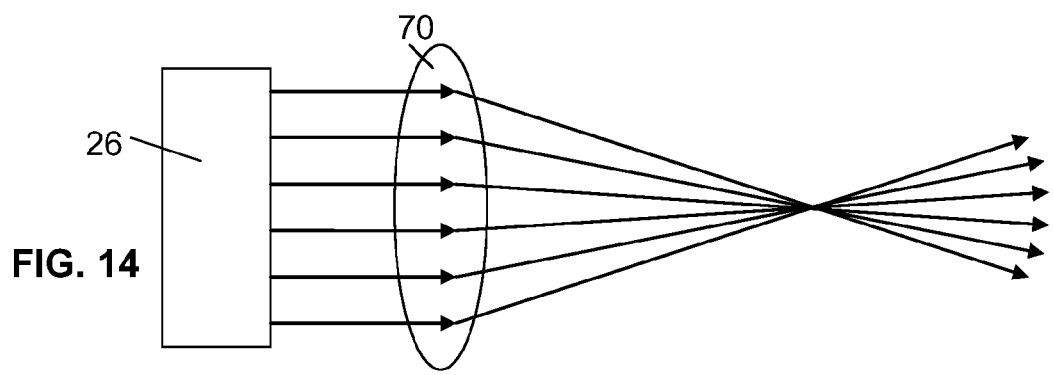
FIG. 14 is a top view of a linear wedge transducer with a lens for generating surface acoustic waves in a radial pattern, according to a specific embodiment.

FIG. 14 shows another embodiment of a surface acoustic wave generator 14. The transducer may include a conventional wedge transducer 26 or a grating transducer. The transducer generates the waves to propagate along a line (using a conventional linear wedge) where the surface acoustic waves propagate predominantly in a linear pattern on the touch surface 12.

To fan out the surface acoustic waves, one or more acoustic lenses 70 are provided. The lens may be formed by printing material on the glass surface, such as printing glass-frit or other material that modifies the surface acoustic wave phase velocity. The lens 70 may be etched into, printed on as an ink, or bonded onto the touch surface 12 adjacent to the transducer 26. As previously discussed in connection with FIG. 12, in one embodiment, the lens 70 is formed as a curved corner connecting surface 24. The corner connecting surface 24 of the glass of the touch surface 12 may be shaped and used to redirect the surface acoustic waves in order to obtain a radial wave pattern on the touch surface.

The lens 70 has a focus causing the incident surface acoustic waves to diverge over a range of angles directed towards a touch region 16 of the touch surface 12. A wide range of angles may be provided, according to various embodiments. If lens 70 is fabricated by simply adding to the array mask a region of printed material in an appropriate lens, the relatively modest change in surface acoustic wave phase velocity, such as a few percent, may support only a limited range of angles. This range of angular spread may be increased by including additional lenses like lens 70. Alternatively the design and manufacturing processes to fabricate lens 70 may be selected to provide a more dramatic change, such as a factor of two, of surface acoustic wave velocity within lens 70. The lens 70 and the transducer 26 are positioned on a same side of the touch substrate 10. The lens 70 causes the surface acoustic waves to diverge as the waves travel over the touch substrate 10 in the touch region 16. The divergence is provided without reflection of at least the surface acoustic waves used for touch sensing.

Figure 15:
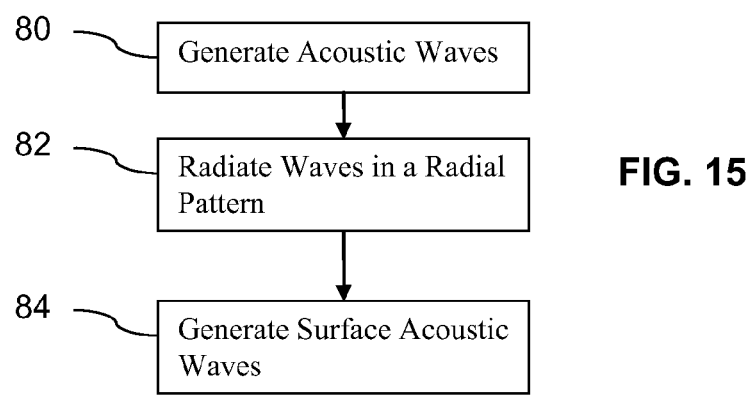
FIG. 15 is a flow chart diagram of one embodiment of a method for generating radial surface acoustic waves.

FIG. 15 shows a method for generating radial surface acoustic waves. The method uses one or more of the surface acoustic wave generators 14 discussed above or a different type of surface acoustic wave generator 14. The method is implemented in the order shown, but a different order may be provided. For example, act 82 occurs simultaneously with act 80 using a curved piezoelectric. As another example, act 84 occurs prior to act 82, such as using the surface acoustic wave generator 14 of FIG. 12. Additional, different, or fewer acts may be provided.

In act 80, acoustic waves are generated. The acoustic waves are pressure waves. Alternatively, the acoustic waves may be shear or other wave types. The waves are generated by a piezoelectric or other diaphragm. For example, a microelectromechanical membrane generates pressure waves.

In act 82, the waves are radiated in a radial pattern. The generated waves are reflected, focused, diverted, or otherwise caused to diverge. Any amount of divergence may be provided, such as at least 45°. Any distribution of energy over the range of the fan beam may be used, such as generally even distribution. The pressure waves and/or the surface acoustic waves diverge. The divergence may occur without convergence or occur in response to convergence of waves.

In act 84, the pressure waves generate surface acoustic waves. A modal conversion causes the surface acoustic waves in response to pressure waves incident on the touch surface. On the touch substrate, the generated surface acoustic waves diverge.

Instead of being designed to produce a broadly fanned out beam, the surface acoustic wave generators may be designed with a very long focal length. While very long focal length radial transducers provide insufficient angular spread of radial beams to be of value in the touch sensor layout designs supporting multiple touch functionality, such as will be discussed below, very long focal length radial transducers may provide an incremental improvement in the design of conventional SAW touchscreens. The focal length is about half the length of a reflective array, but may be tuned longer or shorter to optimize SAW touchscreen signal quality. The beam from such a long-focal length transducer is initially converging and may reduce the fraction of beam power that spreads beyond the footprint of the reflective array. Such misdirected acoustic power is not only lost signal but also a potential source of undesired acoustic parasites. In this fashion, very long focal length radial transducers may be of value to increase signal and reduce backgrounds even for otherwise conventional SAW touchscreen designs.

FIG. 1 shows an example layout for a touch sensor using a radial pattern of surface acoustic waves for illustration purposes. The radial transducer 14 generates the radial pattern of surface acoustic waves represented by the rays 18. The radial pattern is in the touch region 16. FIG. 1 shows the radial pattern of waves diverging as they are transmitted from radial transducer 14 across the touch region 16. In the reverse direction, assuming the direction of the rays (arrows) is opposite that shown in FIG. 1, the radial transducer 14 would receive the radial pattern of waves that would converge toward transducer 14.

The touch sensor layouts described herein are for a touch sensor or a touchscreen. A touch sensor uses an opaque, semi-transparent, or transparent substrate regardless of whether a display is provided behind the sensor. A touchscreen is a touch sensor with sufficiently transparent touch substrate to be provided above a display. Displays being typically rectangular, touchscreens also are rectangular but any shape may be used.

FIG. 1 is an example of directly generating the radial pattern. In alternative embodiments, the radial propagation pattern is generated by reflection, such as using a conventional wedge or other transducer transmitting acoustic energy along a linear propagation direction and then reflecting the acoustic energy in a diverging radial pattern different from the linear propagation direction such as seen in FIG. 11. In still other alternative embodiments, such as shown in FIG. 14, the radial propagation pattern is generated with refraction by using a conventional wedge or other transducer with one or more lenses to cause the linear propagation of waves incident on the lens to then diverge.

FIGS. 17-21 show alternative embodiments of touch sensor layouts using a radial pattern of acoustic waves. The radial pattern is of a fan beam with generally uniform amplitude across the width of the beam. "Generally" accounts for variation but still with an amplitude above a noise level, allowing detection of touch. For example, the amplitude of the signal corresponding to at any given touch location is within 6 or 10 dB of a peak amplitude. The beam edges fall below this level. In the figures, this radial pattern is represented by rays for simplification. Alternatively, the radial pattern is of two or more distinct beams represented by the rays such as would be produced if the smoothly curved reflective surface 40 of in a radial wedge transducer design of FIG. 3A were replaced by a faceted geometry composed of flat reflective surfaces. A continuous swath of beams may be desired in order to enable measurement of a continuous coordinate. Nevertheless for applications for which only discrete coordinate values are needed, it is an option to use distinct beams that propagate in a diverging or converging pattern across the touch region. The rays may correspond to acoustic paths along which a touch may be detected. Where reflective arrays are used, due to spacing of any reflective elements, discrete acoustic paths may be defined for detection. A further simplification is provided in FIGS. 18-21 where only the rays representing acoustic wave paths intersected by a touch are shown.

Figure 17:
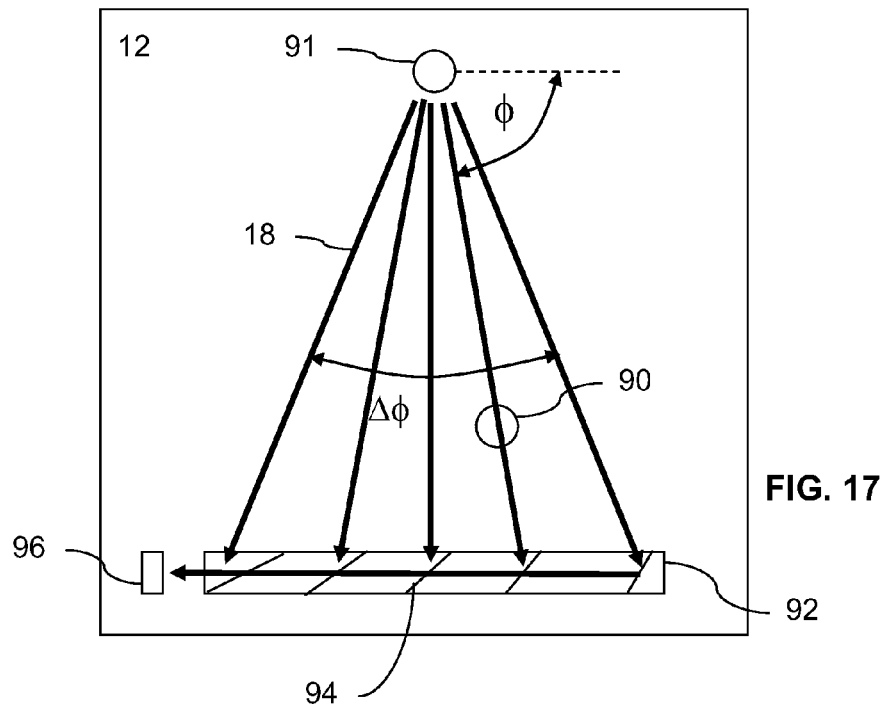
FIG. 17 is a top view diagram of a touch surface layout using a radial pattern according to one embodiment.

FIG. 17 shows a radial transducer 91 for generating surface acoustic waves on the touch surface 12. Any of the radial transducers 91 discussed above may be used, such as a radial wedge transducer or a curved grating. The radial transducer 91 is on or bonded to the substrate. The radial transducer 91 generates the acoustic energy along different radial lines 18, either as a fan beam or discrete beams. Alternatively, a transducer generates acoustic energy propagating along a line and one or more reflectors or lenses cause the acoustic energy to fan radially (for example, as seen in FIG. 11 or 14).

A receive transducer 96 is positioned to receive acoustic waves. The receive transducer 96 is any type of conventional transducer, such as a linear wedge or grating transducer. In the embodiment shown, the receive transducer 96 receives acoustic energy from substantially (accounting for beam width or variance) one direction represented by the arrow directed toward transducer 96. As seen in FIG. 17, surface acoustic waves are transmitted radially from radial transducer 91 across the touch surface 12 toward a reflective array 92 having spaced apart reflective elements 94, each reflective element in the array being differently angled from the others in order to reflect the radial surface acoustic waves into a linear direction toward receiving transducer 96, as described further below. As shown in a simplified manner, the array 92 of reflective elements 94 reflects the acoustic energy from transducer 91 in the radial pattern to a line directed at the receive transducer 96. In alternative embodiments, the reflectors 94 are positioned to reflect the acoustic energy in a radial pattern, such as reflecting in a converging pattern to the receive transducer 96. Since the acoustic energy is received from more than one direction, the receive transducer 96 may be a radial transducer. In yet other embodiments, the transducer 96 is used to transmit the acoustic energy in a linear direction across the reflective array 92, which partially reflects the linearly propagating waves into a converging radial pattern towards the radial transducer 91 acting as the receive transducer (this is illustrated merely by reversing the direction of the arrows of the propagation rays in FIG. 17).

The receive transducer 96 is positioned relative to the reflective elements 94 and/or the transmit radial transducer 91 to receive the acoustic energy from the different radial lines 18. In one embodiment, there is a sufficient density of reflective elements 94 (most of which are not shown) so that each radial line 18 intersects multiple reflective elements 94. The set of acoustic paths corresponding to radial lines 18 produces a continuous swath or fan of beams. In applications where it is desired to measure discrete angular coordinate values rather than measure continuous touch position coordinates, array 92 may be formed of discrete clusters of reflective elements 94 corresponding to angles or radial lines 18 along which acoustic energy is received. The reflective elements 94 may be spaced (e.g., center to center) to optimize coherent scattering for the desired change in direction from that of the incident radial beam to that of a beam directed towards transducer 96. This may result in a variable spacing of reflector elements 94 that deviates from integral multiples of wavelength.

Reflective elements 94, which may be glass frit printed or patterned to reflect at least some of any incident acoustic energy, are sized and shaped to reflect acoustic energy that has traveled across or is going towards the touch region 16. The reflective elements 94 are positioned to redirect at least some of the surface acoustic waves from the radial pattern to propagate towards another reflector and/or the receive transducer 96. The angle of each reflective element 94 is set based on the angle of the incident acoustic path and the location to which the acoustic energy is to be reflected. For parallel acoustic paths derived from 90° scattering, the reflective elements in a conventional reflective array are uniformly at 45°. However, for radial acoustic paths, the reflective elements 94 are oriented to support reflections where the angle of incidence equals the angle of reflectance, and such an array 92 of reflective elements 94 may be referred to as a "radial reflective array". The reflective elements 94 thus may be at various angles besides 45°. For example, to satisfy the angle of incidence equals angle of reflectance, the angle between the axis of reflector array 92 and individual reflectors 94 may vary as $(90°-\phi/2)$ where $\phi$ is the radial beam angle for the beam indicated in FIG. 17. With the radial reflective array's elements 94 in the line as shown in FIG. 17 and the acoustic paths radiating from transducer 91 at different angles, each reflective element 94 has a different angle to reflect the incident radial acoustic energy in a linear direction to the receive transducer 96.

While five reflective elements 94 are shown for simplicity in FIG. 17, many more may be provided. For example, the element 94 are spaced, in a range from less than one to more than a few wavelengths apart along the line forming the array 92. For interacting with parallel acoustic paths and reflection by 45°, the reflective elements 94 may be spaced along the array axis at integral numbers of acoustic wave wavelengths. For the radial pattern, the spacing may be non-uniform. The reflective elements 94 are spaced to provide phase coherence between sequential elements 94. For example, to provide phase coherence, the spacing "S" between adjacent reflective elements 94 may be according the formula $S=n\lambda/(1+\cos(\phi))$ where n is an integer, $\lambda$ is the surface acoustic wave wavelength and $\phi$ is the angle between radial beam angle and the axis of reflector array 92. Due to attenuation of the surface acoustic wave as it propagates in the substrate and shadowing due to reflective elements 94 between the scattering point and transducer 96, signals corresponding to longer acoustic paths tend to be weaker than signals corresponding to shorter acoustic paths, thus leading to a need for signal equalization methods. One such method is to use n=1 for the longest acoustic paths and larger values of n for shorter acoustic paths. Another such method is to design the radial transducer 91 so that the amplitude to emitted radial surface acoustic wave beams vary with radial beam direction angle $\phi$ so as to be stronger for longer acoustic paths and weaker for shorter acoustic paths. The reflective elements 94 of the array 92 are shown along a line, but in other embodiments the elements 94 may be arranged along a curve or other non-linear shape, or with a complex or simple distribution.

Due to the different path distances, the acoustic energy along different radial paths is received at different times by the receive transducer 96. The different timing may be used to identify one or more radial paths 18 along which acoustic energy is attenuated. If a touch (represented by 90) intercepts an acoustic path, the touch 90 attenuates the received signal at a delay time corresponding to the angle $\phi$ of the intercepted radial beam. A polar coordinate detection is made. Using the radial pattern alone, the angle of the touch 90 may be detected. To detect a point location of the touch 90, additional acoustic paths or directions of travel may be used.

Due to the use of a radial transducer, reflectors, waveguides, and/or other structure, at least part of the radial wave pattern is provided in the touch region 16 between the transmit transducer 91 and receive transducer 96. One or more portions of the acoustic paths may not be in the radial pattern. All or only part of the touch region 16 uses the radial pattern for touch sensing. Other patterns of the same or different acoustic paths may cover other parts of the touch region. The acoustic paths along which detection is performed are spaced sufficiently close such that a stylus, finger, and/or finger nail may be detected. Greater resolution may or may not be provided for covering the touch region, according to different embodiments.

The radial pattern diverges (or converges) over an angular span or arc $\Delta\phi$. The beam edges are over a 20°, 45°, 90°, 180° or other arc. The arc may be greater or lesser. The arc is within the touch region 16. While shown as an evenly distributed or simple divergence, the radial pattern may include non-linear paths. For example, reflections or other disturbances may cause or be used to cause acoustic energy along some, a subset, one, or all of the acoustic paths to change direction within the touch region 16.

Figure 18:
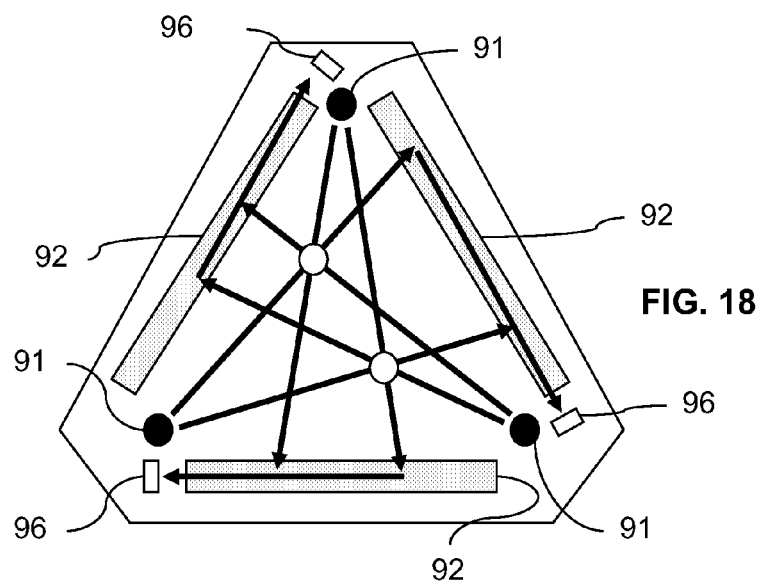
FIG. 18 is a top view diagram of an embodiment of a touch sensor layout with a radial pattern for a triangular touch region.

FIG. 18 shows an example using multiple radial patterns, resulting in intersecting directions of travel of acoustic waves, where the touch surface, substrate, and corresponding touch region are triangular. The triangular touch sensor is formed from three groups of a transmit transducer 91, a receive transducer 96 and an array 92 of reflectors 94. For an equilateral triangle touch surface, the arc for each radial pattern is about 60°. Non-equal arcs may be used. Due to the different geometric arrangement, the angle and spacing of the reflectors 94 (not shown for simplicity) may be different than provided for the arrangement of FIG. 17.

A pair of touches (white circles in the touch region) is illustrated. There is no dual touch ambiguity as the point location of each touch may be determined. Each receive transducer determines an angle for each touch, so three angles are provided for each touch. Two angles may be used to determine the location of one touch. The other angle may be used to resolve the ambiguity for simultaneous touches. Only the two true touch positions are consistent with a measured angle from an attenuated radial beam from each of the three radial transducers 91. This arrangement allows for multi-touch applications involving two or more simultaneous touches. Intersections of triples of attenuated radial beams uniquely locate each touch.

Figure 19:
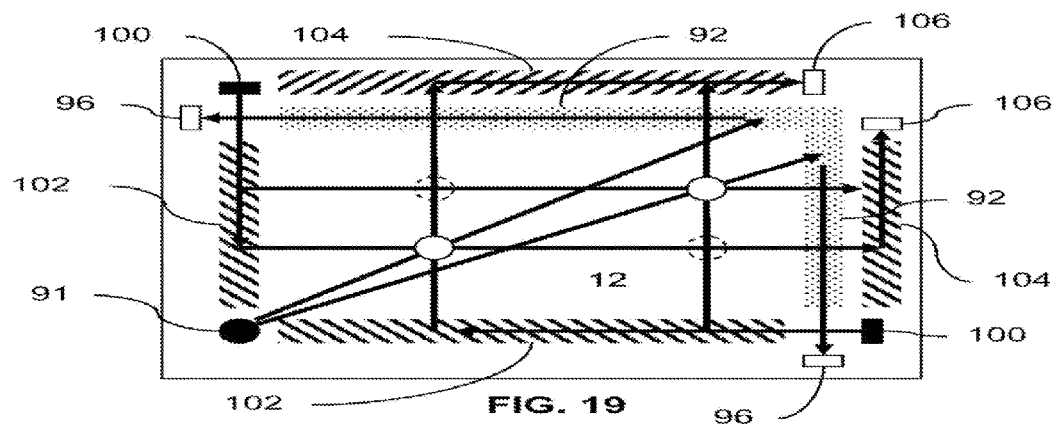
FIG. 19 is a top view diagram of an embodiment of a touch sensor layout with a radial pattern for a rectangular touch region.

FIG. 19 shows a touch sensor using a radial pattern on a rectangular touch region or substrate. The touch sensor of FIG. 19 may also resolve ambiguity for multiple, simultaneous touches using a layout that includes one radial transducer subsystem in addition to standard Adler-type X and Y measuring arrays and transducers (e.g., parallel wave patterns).

For the parallel wave patterns, two sets of transmit transducers 100, transmit reflective arrays 102, receive reflective arrays 104, and receive transducers 106 are provided. It is understood that the transmit and receive directions may be reversed in some embodiments. Conventional pairs of arrays 102, 104 of reflective elements create a set acoustic paths between the transmit transducer 100 and the receive transducer 106. The two sets are perpendicular to each other, such as corresponding to an X axis and a Y axis. Four acoustic paths are shown in FIG. 19 for the two touches (white circles), two horizontal and two vertical. Other paths exist, but are not shown to avoid clutter. The paths are parallel to each other for a given direction (i.e., two sets of parallel acoustic paths).

The two parallel wave patterns covering the entire touch region along two directions are sufficient to determine a single touch location at a given time. If simultaneous touches occur, there are two paths with attenuation in the X direction and two in the Y direction. The detection is not sufficient to resolve the ambiguity between the four possible locations (dashed and full circles). One or more radial patterns thus are provided to resolve the ambiguity.

Any radial pattern may be used, such as providing for two or more different radial patterns to cover different parts of the touch region. In the embodiment shown in FIG. 19, a single radial pattern is used. To cover the entire touch region, the radial pattern has an about 90°arc. As a result, the acoustic energy of the radial pattern is transmitted towards or away from two peripheral edges of the touch region. Radial reflective arrays 92 are provided along the two edges. There is more than one option for reflective element orientations, so radial reflective arrays 92 in FIG. 19 are shown schematically as gray areas without the reflective elements being explicitly shown. The reflectors could be angled to reflect the acoustic energy to one transducer 96 in some embodiments, but then there may be ambiguity due to similar or equal path lengths from waves traveling to each of the substrate edges. In a specific embodiment, the radial reflective arrays 92 may merge at a corner and be positioned to reflect the acoustic energy to different receive transducers 96 as shown in FIG. 19, where a separate receive transducer 96 is provided for each edge. One receive transducer 96 detects perturbations of the radial beams above the diagonal of the touch area, and another receive transducer 96 detects perturbations for radial beams below the diagonal. The receive transducers 96 are spaced apart such as shown, or may be positioned adjacent each other in a corner common to the two edges (i.e., the corner opposite the radial transducer 91).

The radial reflective arrays 92 are positioned in front of (as shown) or behind the conventional arrays 102, 104. The reflective elements 94 of the arrays 92 allow sufficient acoustic energy to pass that detection is provided despite the waves passing through the array 92. An individual reflective element 94 may reflect on the order of 1% of incident surface acoustic wave energy and transmit the remainder. A significant fraction of the surface acoustic wave energy incident on arrays 92 propagates through arrays 92 to arrays 104.

As shown, the arrays 92 scatter radial beams directly towards receive transducers 96. In another embodiment, the arrays 92 do not scatter radial beams directly towards transducers, but the radial waves are scattered by arrays 92 so that the waves are directed perpendicularly to the arrays 104, allowing the arrays 104 and associated transducers 106 to be used for transmission or reception of the radial waves. This may remove the need for the transducers 96 where the X, Y and radial detections are performed sequentially. The reflective elements without arrays 92 are spaced and angled so that the beam coherently scattered in the right direction. The number and positioning of the reflector may be set to provide similar signal strength for different paths.

For detection with the parallel wave patterns, different acoustic paths correspond to different path lengths from the transmit transducer 100 to the receive transducer 106. The different path lengths result in different delay times of an acoustic signal on one path relative to an acoustic signal on another path. For example, a short tone burst (e.g. ~5 usec) from a transmit transducer 100 results in a much longer signal at the receive transducer (e.g. ~200 usec) due to the burst being routed along a plurality of acoustic paths. When no touch is present, the controller stores a reference wave form. Comparison with the reference wave form indicates the delay and associated path corresponding to any attenuation when a touch occurs.

For two simultaneous touches (solid circles), the acoustic wave amplitude is attenuated for four acoustic paths in the two parallel patterns. The received signals at corresponding delay times are reduced. From the delay times of signal reductions, the X coordinates and the Y coordinates of the two touches are determined, but there is an ambiguity. The dashed circles represent possible touch locations using the same four acoustic paths. The radial acoustic pattern generated by the radial transducer 91 is used to resolve the ambiguity. Only intersections of attenuated X and Y beams that also correspond to an attenuated radial beam correspond to true touch locations. There are no attenuated radial beams corresponding to the dashed circles.

Figure 20:
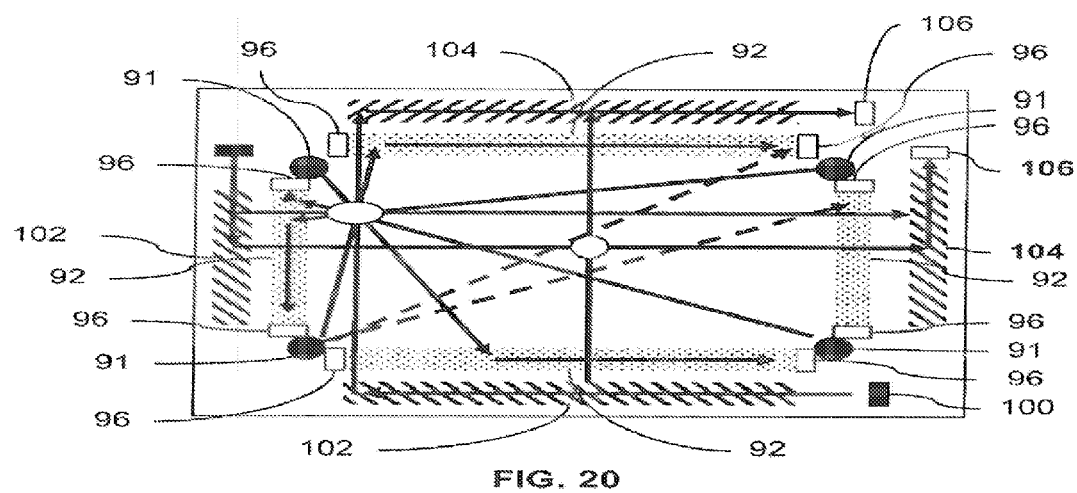
FIG. 20 is a top view diagram of another embodiment of a touch sensor layout with a radial pattern for a rectangular touch region.

FIG. 20 represents addition of further radial patterns generated by additional radial transducers 91 relative to FIG. 19, according to a specific embodiment. Three more sets of transmit radial transducers, receive transducers, and radial reflective arrays are provided. In FIG. 20, the radial reflective arrays shown are not merged (like the radial reflective array 92 shown in the embodiment of FIG. 19) but are distinct arrays. The radial reflective arrays 92 in FIG. 20 are shown schematically as gray areas without the reflective elements being explicitly shown. A radial pattern terminating or originating at each corner is provided. In alternative embodiments, only two radial patterns, or three or more than four radial patterns may be used. Radial patterns originating or terminating at locations other than the corners may be used (an example is shown in FIG. 17). In other embodiments, only the radial patterns without the X and Y (horizontal and vertical) patterns are provided, such as seen in FIG. 23.

Due to the positioning of the reflectors and/or transducers, there may be one or more radial lines along which detection is not performed for a given radial wave pattern, such as represented by the region between the two dashed radial lines seen in FIG. 20. The X and Y detection is able to detect the center or other location that may be a blind spot common to detection based on all the radial patterns. For other locations (e.g., non-center locations), even if detection based on one of the radial patterns provides a blind spot, detection based on the other or remaining radial patterns may be used to resolve location. In the embodiment shown in FIG. 20, six different sources of location information are provided (X, Y, and four angles).

Acoustic waves from two different radial patterns are received at each of the radial reflective arrays. The difference in angle of incidence is used to direct the acoustic energy to the appropriate receive transducer. The reflectors are angled and spaced to reflect the acoustic energy of one radial pattern a first direction and other reflectors are angled and spaced to reflect the acoustic energy of the other radial pattern in a second, opposite direction. For any given location in the array, the acoustic energy from the two different radial patterns arrives or leaves at a different angle. The reflectors are superposed, that is, combined into one array area without overlapping reflective elements at different orientations. Alternatively, separate arrays in a side-by-side arrangement are provided, such as discussed above for the arrays of the parallel pattern with the arrays for the radial pattern. In yet other alternatives, the reflectors for the parallel pattern may be superposed or arranged in a same line or array with the arrays for one or more radial patterns.

For use of the touch sensor on a screen, the transducers and reflective arrays are on the same surface of the substrate as the touch region. FIGS. 18-20 show arrangements with all the components on the top surface. For grating transducers, the piezoelectric may be on the back side. To protect and hide the transducers and associated wiring, the touch sensor is assembled, such as for a touchscreen, with arrays and transducers on the front substrate surface covered by a protective bezel in the final product of which the touch sensor is a component. The bezel covers the top surface-mounted components of the touch sensor outside of the touch region in the complete product. These components are shown larger than needed for description herein. The transducer sizes and array widths are exaggerated relative to the dimensions of the touch region for clarity. The transducer and arrays may be on a 20 mm or less margin of the touch sensor.

Figure 21:
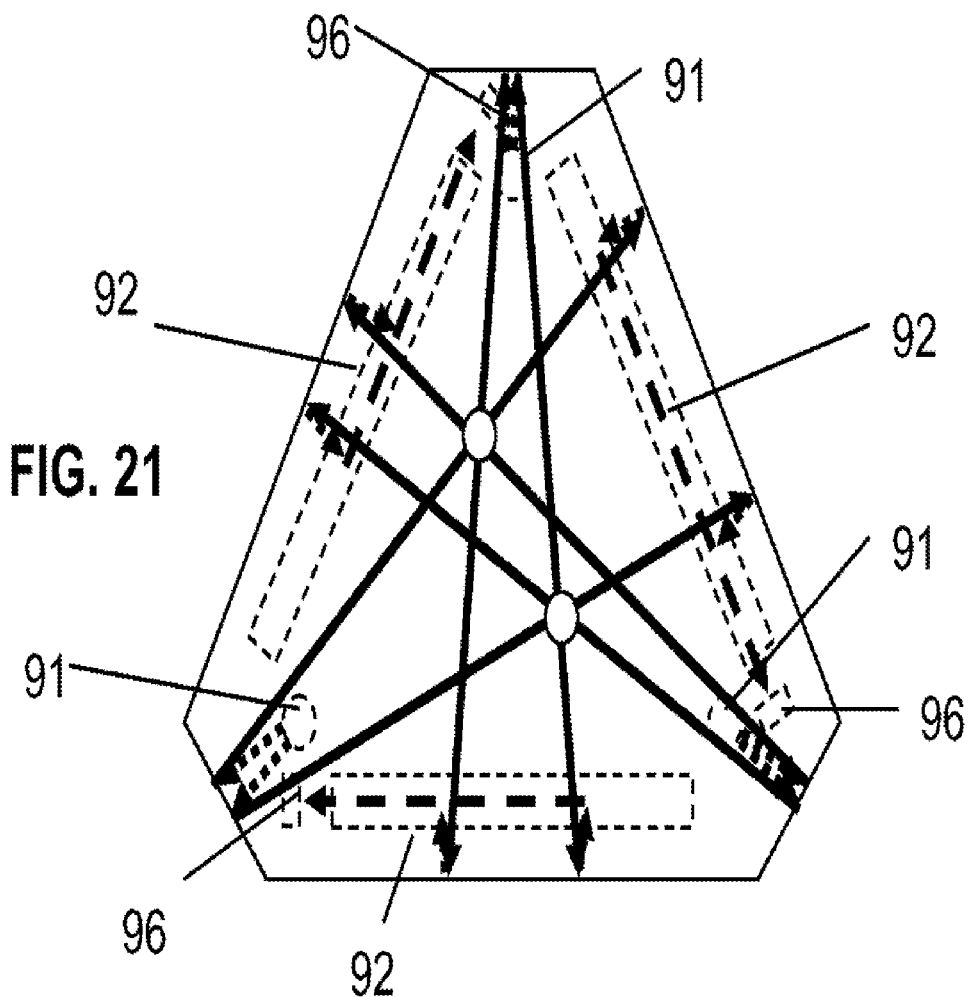
FIG. 21 is a top view diagram of an embodiment of a zero-bezel touch sensor layout with a radial pattern for a triangular touch region.

It is noted that some embodiments of touch sensors may have bottom surface-mounted transducers and arrays, eliminating the need for any bezel on the finished product. For example, FIG. 21 shows a touch sensor for use with a zero-bezel final product. A triangular substrate and touch surface is shown in this example, but rectangular or other shapes may be used. Triangular is shown to more simply represent the propagation of the surface acoustic waves. In FIG. 21, the solid rays represent propagation on a top surface for touch detection. The dashed rays represent propagation on a bottom surface. The arrays of reflectors and transducers positioned on the back of the substrate are also shown in dashed lines. This arrangement allows the entire top surface to be free of any obstructions while placing all arrays and transducers that need protection on the back side of the substrate, hence permitting a final assembled product with no bezel. In other embodiments some, but not necessarily all, arrays and transducers are located on the back side.

The connecting surfaces between the top and bottom surfaces of the substrate are rounded. The surface acoustic waves generated on the bottom surface are directed towards and then travel over the rounded connecting surface, and propagate over the touch region, which may be part of or the entire top surface and/or the connecting surfaces. Similarly, the surface acoustic waves that travel through the touch region travel over another connecting surface and to the radial reflective arrays and/or receive transducers on the bottom surface. The peripheral edge of the substrate may be straight or curved along the circumference, such as straight as shown in FIG. 21 or curved as shown in FIG. 12. In alternative embodiments, one or more reflectors and/or transducers could be positioned at the periphery or on the top surface.

In other embodiments, edge waves are used for transmitting or receiving. For example, the edge wave array of periodic perturbations described in U.S. Published Application No. 2005/0243071, which is incorporated by reference, may be used.

In yet other embodiments, sputtered, printed, or PVDF interdigital transducers positioned along all of or part of an edge are used for transmission or reception of surface acoustic waves. The interdigital transducers are positioned to generate the desired surface acoustic waves in a continuum or at multiple locations adjacent to the touch region.

The number of transducers may be reduced by using reflectors. For example, a series of reflectors reflect the surface acoustic waves along the same or different direction of travel. The reflectors may be positioned so that the same transducer acts as both transmitter and receiver. The surface acoustic waves are generated, pass over the touch region, and are then reflected back to the same transducer.

FIG. 23 shows another example layout where two radial transducers 91 (shown as grating transducers) are in two corners of the touch surface. For one of the radial transducers 91, two transducers A and B are provided with radial reflective arrays 106 and 108, respectively, along edges opposite the radial transducer 91. For the other of the radial transducers 91, two transducers C and D are provided with radial reflective arrays 110 and 112, respectively, along edges opposite the radial transducer 91. In sequential operation, the transducers A and C and the transducers B and D may be connected to a same pulse generator, controller or sensor channel.

In one embodiment, the radial transducer(s) used are gratings (such as shown in FIG. 13) etched onto a front surface of the glass or substrate in one or more corners. The piezoelectric block is positioned opposite the grating on the back surface. Along two or more edges, interdigital transducers are positioned on the back surface. The interdigital transducers extend along most or all of the edge for transmitting or receiving acoustic energy along a line or edge. The interdigital transducer structure may either be excluded from the locations of the piezoelectric blocks, or the piezoelectric block may be placed further from the substrate edge than the interdigital transducer structure, or alternatively the piezoelectric blocks for the radial transducers may be positioned over of the interdigital transducers so that the compression wave from the piezo blocks travels through the interdigital transducers an through the glass.

Other layouts with any combination of radial, parallel, or other patterns may be used. Various locations in the touch region are intersected by acoustic paths from different directions, allowing determination of location. By providing a sufficient number of acoustic paths or patterns, multiple touches may be detected and the corresponding locations determined.

Figure 22:
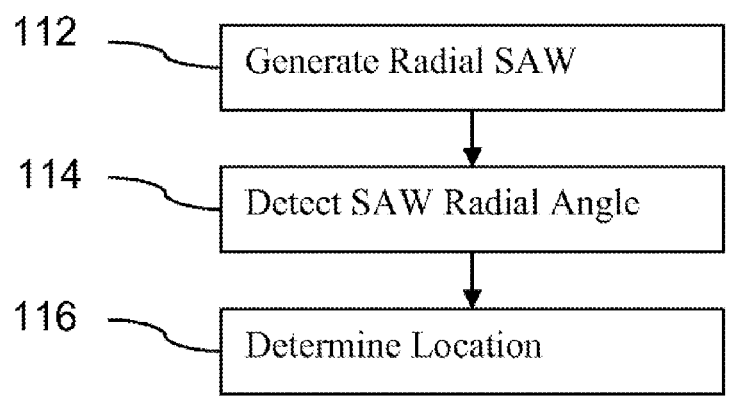
FIG. 22 is a flow chart diagram of one embodiment of a method for detecting one or more touches with a radial wave pattern.

FIG. 22 shows a general method for detecting a touch on a surface. The method is implemented using the touch sensors, layouts, and/or radial transducers discussed above or different touch sensors, layouts, and/or transducers. Additional acts may be provided.

In act 112, an acoustic fan is generated. The fan is generated as surface acoustic waves. Other types of acoustic waves may be used. A piezoelectric element or film generates longitudinal, shear or other waves. The waves are converted to surface acoustic waves or used directly.

The fan has non-parallel edges over the surface in an area for the touch. A radial transducer and/or reflectors cause the acoustic beam to fan out or diverge. Any range or arc of the fan may be generated, such as 45° or more. The opposite, side edges of the fan diverge at an angle of 45° or more. A converging fan may be generated, such operating in a receive rather than a transmit mode. By reversing the direction of propagation, a converging fan is created. The fan beam is generated directly, such as with a radial transducer. Alternatively, the fan beam is generated indirectly, such as by reflection or lensing from a linear beam.

In act 114, an angle associated with a touch is detected. The temporal profile of the received acoustic energy is compared to a reference profile. The location with attenuation is identified from the comparison. The delay associated with location on the profile indicates the acoustic path along which the touch occurred. In a polar coordinate system of a fan beam, the acoustic path corresponds to an angle.

For determining the angle, the acoustic path timing accounts for any reflections, such as the reflection of acoustic energy by radial reflective arrays from different radial beams to a receive transducer. The radial beam or angle associated with attenuation in the acoustic fan is determined from the timing. By determining the timing associated with the attenuation over the complete path, the acoustic path may be determined. Without the radius along the acoustic path being determined from one measurement, the angle associated with the attenuation is determined without resolution of the point location of the touch. In alternative embodiments, attenuation is determined along a given path where the path represents a collection of points, such as a pair of line segments, rather than a simple radial line. For example, a path may be reflected or otherwise be associated with all the locations along any non-straight path. The timing of the attenuation is used to determine the path and corresponding possible locations of the touch.

Radial transducers may be used to detect radius along a radial line at which a touch occurs. The angle or radial is detected by timing associated with attenuation. The radius along the radial is detected by width of the attenuation. Referring to FIGS. 24 and 25, detecting radius is shown. The location 90 of the touch is shown closer to the radial transducer 91 in FIG. 24 than in FIG. 25. The location 90 of the touch is at a different radius in FIG. 24 than FIG. 25, but along a same radial or at a same angle $\phi$ relative to the radial transducer 91. The angle is detected by the timing of attenuation in the received signal. The reflectors 92 redirect the surface acoustic waves to the transducer 96. Since the surface acoustic waves at different angles travel different distances to get from the radial transducer 91 to the receive transducer 96, a waveform 200, 202 of surface acoustic wave amplitude over time is generated. The attenuation at a particular point along the waveform 200, 202 indicates the angle. The attenuation is represented as the dip or notch in the waveform 200, 202. A shadow is observed in the received signal at the transducer 96, and the mean time delay associated with the attenuated signal determines the touch coordinate angle $\phi$. The center of the shadow or attenuation notch occurs at the same time, indicating the same angle in both examples of FIGS. 24 and 25.

The radius along the radial of the location 90 of the touch results in further differences in the waveform 200, 202 received at the transducer 96. The width or duration of the signal attenuation due to the touch is different depending on the radius. The duration of the notch or attenuation is longer for touches closer to the radial transducer 91 (see FIG. 24) and shorter for touches further from the radial transducer 91 (see FIG. 25). The duration of the touch induced attenuation (i.e., width of the notch) in the waveform 200, 202 the received transducer 96 provides information about the radial distance between the location 90 of the touch and the radial transducer 91. By detecting the duration or width of attenuation, the radius of the location is determined.

There is some ambiguity between a touch with a larger substrate surface contact area further from the radial transducer 91 and a touch with smaller contact area closer to the radial transducer 91. In the layout of FIG. 19, for example, this ambiguity may at least partially be resolved by determining the contact area from touch shadow strengths observed in the X and Y signals received by the transducers 106. In other layouts, other surface acoustic wave measurements, such as from other angles or directions, may be used to resolve the size ambiguity. The size determined from the width in other measurements is averaged, selected or combined to provide a width perpendicular to the detected angle $\phi$. Given this width of the contact area, the radius along the radial is determined by the width in the waveform 200, 202. A lookup table, mathematical function, or other process correlates the width in the wavefrom 200, 202 with the radius given a size of contact.

In addition or as an alternative to the radius determined by the width of the attenuation, a measure of total touch signal strength (e.g. SAW attenuation integrated over angle $\phi$) may be used to determine positions of multiple simultaneous touches. For example, referring to FIG. 19, if the total signal strength of the upper right touch is measured using X and Y signals from transducers 106 is used to determine the touch size, and this touch size is used with the total signal strength from the radial signal from radial transducer 91 to receive transducer 96, the radius of the touch may be determined. If this radial depth is consistent with the (x,y) coordinates from the X and Y signals, then the touch location is confirmed. If not, a false association of shadows is rejected. Hence the extra radius information provides an additional level of redundancy resolve ambiguities. This added information to resolve ambiguities becomes more valuable with larger numbers of simultaneous touches even if of limited usefulness in the simple two touch case illustrated in FIG. 19, In act 116, the point location is determined. To resolve ambiguity for the point location of the touch, an additional pattern of acoustic energy is generated. For example, another acoustic wave fan propagates on the surface. The other acoustic fan traverses the surface in a different direction, such as from a different angle.

The transmitting of different fan beams or sensing along different patterns of paths occurs sequentially. After an acoustic pulse traverses along one pattern, another acoustic pulse is generated for another pattern. The patterns are used sequentially. In alternative embodiments, the detection maybe performed along one pattern more frequently than another. In yet other embodiments, simultaneous detection may be used, such as by simultaneous excitation of more than one transmit transducer and either design. If the acoustic design of the touch sensor is not sufficiently clean to avoid cross-talk between simultaneously measured signals, effects of acoustic cross-talk may be reduced by a variety of methods including use of coded pulses.

By having two fan beams propagating from different directions, a point location may be determined. The angle for each defines a line on the surface. The intersection of the acoustic paths or lines defines the point location. The point location is any size point, depending on the resolution of the touch sensor. The point may correspond to an area, but is an area associated with a touch. The use of "point" is to distinguish from the line or angle that may be determined for a touch that extends beyond the region of actual touching.

As another example for determining a point location, a parallel beam pattern is generated in addition to at least one radial pattern. The touch is detected along one of the parallel acoustic paths. Since the acoustic paths of the parallel pattern intersect the paths of the radial pattern from different directions for each possible location, the location may be detected.

In yet another example, two different parallel patterns are generated in addition to at least one radial pattern. In one embodiment, the parallel patterns are perpendicular to each other (e.g., X and Y). By detecting the touch or touches along perpendicular paths, a point location of the touch or touches may be determined by the parallel patterns in conjunction with the radial pattern(s).

By providing for three or more acoustic paths to be detected for each touch, two or more touch locations occurring at a same time may be non-ambiguously determined. For example, two touches occur at a same time. The two touches are along the same or different radial with respect to a given fan beam. The detection based on the fan beam either indicates one angle for the two touches or indicates two angles for the two touches. By using one or more angles detected from another fan beam, a X location from a parallel pattern, a Y location from a parallel pattern, or combinations thereof, the two point locations are determined.

In act 116, the point location of one or more touches is determined as a function of the angle for the fan beam. Another acoustic path is used to determine the point location. The intersection of two different acoustic paths associated with attenuation indicates the point location of the touch. For multiple touches, the intersection of three or more different acoustic paths provides one location and the intersection of three or more other acoustic paths provides another location.

The point location is determined by an attenuated signal at the intersection of two radial beams, each from different radial patterns. Alternatively, the point location is determined at the intersection of a radial beam (angle) and one or more acoustic paths from respective one or more parallel patterns. In one embodiment, four angles, a Y location, and a X location are used to determine the touch location. Three or more acoustic paths for each touch may allow determination of two touches without ambiguity due to multiple attenuations being received by a same transducer. Sufficient patterns are provided to account for any blind spots for one or more of the patterns.

In any of the embodiments discussed above, the surface acoustic waves may be Rayleigh or quasi-Rayleigh waves. Ultrasonic touch sensors using plate waves and Love waves rather than Rayleigh waves may be used in some embodiments. For example, a convex wedge transducer may be used to generate waves in any acoustic mode.

The above description is intended to be illustrative, and not restrictive. The above-described embodiments (and/or aspects thereof) may be used in combination with one another. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

The invention claimed is:

1. A transducer for an acoustic wave touch sensor having a touch substrate, the transducer comprising:
   a piezoelectric element; and
   a radial coupling element connected on a first surface with the piezoelectric element, the radial coupling element having a reflection surface and a boundary surface, the boundary surface on the touch substrate, and the reflection surface positioned relative to the piezoelectric element such that the boundary surface is capable of converting, via refraction, between first acoustic waves reflecting off of the reflection surface and second acoustic waves propagating in a radial pattern on the touch substrate, the first acoustic waves being transmitted at a velocity less than the phase velocity of the second acoustic waves propagating on the touch substrate, the radial pattern diverging as a distance from the radial coupling element increases.

2. The transducer of claim 1 wherein, the reflection surface is curved and angled such that the first acoustic waves reflect back so that the second acoustic waves or the first acoustic waves travel between the piezoelectric element and the touch substrate, in an instance in which the transducer is used in a transmit mode.

3. The transducer of claim 2 wherein, the radial coupling element is positioned on a bottom surface of the touch substrate such that the second acoustic waves travel over a curved connecting surface and onto a touch region on a top surface of the touch substrate opposite the bottom surface.

4. The transducer of claim 1, wherein the reflection surface is curved and angled such that the first acoustic waves travel away from the piezoelectric element after reflection and contact the touch substrate at an angle sufficient to generate the second acoustic waves, in an instance in which the transducer is used in a transmit mode.

5. The transducer of claim 1, wherein the radial coupling element comprises a single piece.

6. The transducer of claim 1, wherein the radial coupling element is configured such that the radial pattern has an angular span of at least 45° where the second acoustic waves in the span are above a noise level.

7. The transducer of claim 1, wherein the first acoustic waves comprise bulk pressure waves and the second acoustic waves comprise surface acoustic waves.

8. The transducer of claim 1, wherein the radial coupling element is comprised of a polymer and the touch substrate is comprised of a glass or a metal.

* * * * *